(12) United States Patent
Horikawa et al.

(10) Patent No.: US 7,706,048 B2
(45) Date of Patent: Apr. 27, 2010

(54) SPECKLE REDUCTION METHOD

(75) Inventors: Yoshiaki Horikawa, Tokyo (JP); Hirotoshi Ichikawa, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 6 days.

(21) Appl. No.: 12/316,402

(22) Filed: Dec. 11, 2008

(65) Prior Publication Data

US 2009/0115917 A1    May 7, 2009

Related U.S. Application Data

(60) Provisional application No. 61/007,568, filed on Dec. 13, 2007.

(51) Int. Cl.
  *G02B 26/00* (2006.01)
  *G02B 26/06* (2006.01)
  *H04N 5/74* (2006.01)

(52) U.S. Cl. .................. 359/290; 359/201.2; 348/771

(58) Field of Classification Search ............. 359/201.2, 359/212.1, 223.1, 224.1, 290, 298, 318; 348/758, 348/770, 771
See application file for complete search history.

(56) References Cited

U.S. PATENT DOCUMENTS

| | | |
|---|---|---|
| 5,272,473 A | 12/1993 | Thompson et al. |
| 5,313,479 A | 5/1994 | Florence |
| 5,589,955 A | 12/1996 | Amako et al. |
| 6,154,259 A | 11/2000 | Hargis et al. |
| 6,249,381 B1 | 6/2001 | Suganuma |
| 6,577,429 B1 | 6/2003 | Kurtz et al. |
| 6,594,090 B2 | 7/2003 | Kruschwitz et al. |
| 6,874,893 B2 | 4/2005 | Park |
| 2002/0114057 A1 | 8/2002 | Roddy et al. |
| 2004/0239880 A1 | 12/2004 | Kapellner et al. |
| 2005/0280745 A1* | 12/2005 | Takeda et al. ............... 348/771 |

* cited by examiner

*Primary Examiner*—William C Choi
(74) *Attorney, Agent, or Firm*—Bo-In Lin

(57) ABSTRACT

A projection apparatus comprising a light source for projecting an illumination light through an illumination optical system to a spatial light modulator (SLM) for modulating the illumination light for generating and transmitting an image projection light to an image projection surface through a projection optical system to display an image. The projection apparatus further includes an image process unit for receiving and analyzing an input image data; and the image process unit applies a conversion process to a signal related to the input image data to generate different control patterns for a plurality of adjacent pixel elements included in the SLM for a predetermined period during at least one frame period to reproduce a gradation of the pixel whereby each of the plurality of adjacent pixel elements has a gradation of approximately a same level.

14 Claims, 20 Drawing Sheets

Fig. 1A (Prior Art)
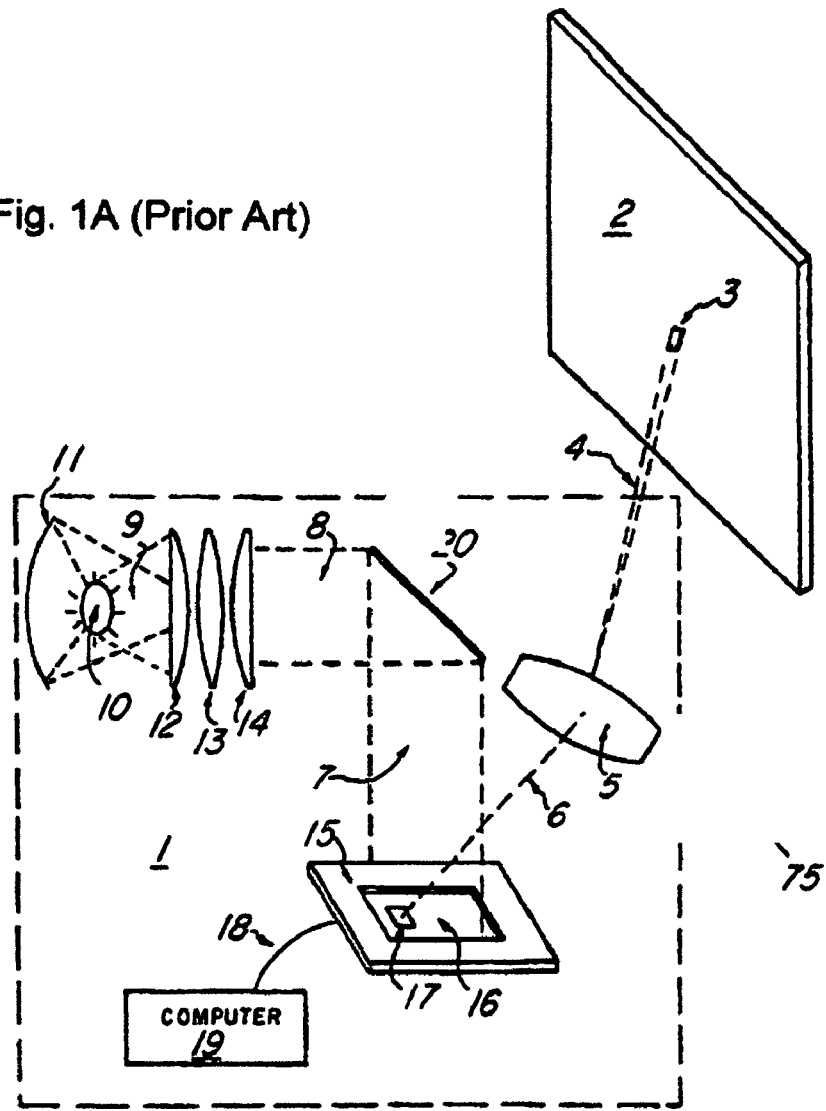
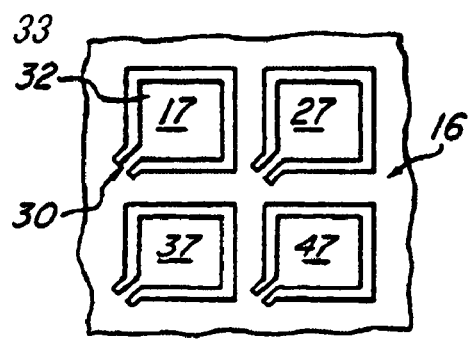
Fig. 1B (Prior Art)

SPECKLE REDUCTION METHOD

CROSS REFERENCE TO RELATED APPLICATIONS

This application is a Non-provisional application claiming a Priority date of Dec. 13, 2007 based on a previously filed Provisional Application 61/007,568, a Non-provisional patent application Ser. No. 11/121,543 filed on May 3, 2005 issued into U.S. Pat. No. 7,268,932 and another Non-provisional application Ser. No. 10/698,620 filed on Nov. 1, 2003. The application Ser. No. 11/121,543 is a Continuation In Part (CIP) Application of three previously filed Applications. These three Applications are Ser. No. 10/698,620 filed on Nov. 1, 2003, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates to a projection apparatus implemented with a laser light source for emitting an illumination light modulated by a spatial light modulator to project a modulated light to display an image. More particularly this invention relates to an image position change unit to change the image projection positions within a predefined range to reduce the occurrence of the speckle effect.

2. Description of the Related Art

After the dominance of CRT technology in the display industry for over 100 years, Flat Panel Displays (hereafter FPD) and Projection Displays have gained popularity because the FPD display implements a more compact image projecting system while projecting images on a larger display screen. Of several types of projection displays, projection displays using micro-displays are gaining recognition among the consumers because of their high picture quality and a lower cost than FPDs. There are two types of micro-displays used for projection displays on the market, i.e., micro-LCDs (Liquid Crystal Displays) and micromirror technology. Because the micromirror devices display images with an un-polarized light, the images projected by the micromirror device have a brightness superior to that of micro-LCDs, which use polarized light.

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 includes a display screen 2 disclosed in a relevant U.S. Pat. No. 5,214,420. A light source 10 is used to generate light beams to project illumination for the display images on the display screen 2. The light 9 projected from the light source transmitted through the mirror 11 is further collimated and directed toward lens 12. A beam columnator includes lenses 12, 13 and 14 is operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

Most of the conventional image display devices, such as the devices disclosed in U.S. Pat. No. 5,214,420, are implemented with a dual-state mirror control that controls the mirrors to operate in either an ON or OFF state. The quality of an image display is limited due to the limited number of gray scale gradations. Specifically, in a conventional control circuit that applies a PWM (Pulse Width Modulation), the quality of the image is limited by the LSB (least significant bit) or the least pulse width, since the control is related to either the ON or OFF state. Since the mirror is controlled to operate in either an ON or OFF state, the conventional image display apparatuses have no way of providing a pulse width to control the mirror that is shorter than the LSB. The lowest intensity of light, which determines the smallest gradation to which brightness can be adjusted when adjusting the gray scale, is the light reflected during the period corresponding to the smallest pulse width. The limited gray scale gradation due to the LSB limitation leads to a degradation of the quality of the display image.

In FIG. 1C, a circuit diagram of a control circuit for a micro-mirror according to U.S. Pat. No. 5,285,407 is presented. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the Static Random Access switch Memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The control circuit, as illustrated in FIG. 1C, controls the micromirrors to switch between two states, and the control circuit drives the mirror to oscillate to either an ON or OFF deflection angle (or position) as shown in FIG. 1A. The minimum intensity of light controllable to reflect from each mirror element for image display, i.e., the resolution of gray scale of image display for a digitally controlled image display apparatus, is determined by the least length of time that the mirror is controllable to be held in the ON position. The length of time that each mirror is controlled to be held in an ON position is in turn controlled by multiple bit words.

FIG. 1D shows the "binary time periods" in the case of controlling the SLM by four-bit words. As shown in FIG. 1D, the time periods have relative values of 1, 2, 4, and 8 that in turn determine the relative intensity of light of each of the four bits, where "1" is the least significant bit (LSB) and "8" is the most significant bit. According to the PWM control mechanism, the minimum intensity of light that determines the resolution of the gray scale is a brightness controlled by using the "least significant bit" which holds the mirror at an ON position for the shortest controllable length of time.

For example, assuming n bits of gray scales, the frame time is divided into $2^n-1$ equal time periods. For a 16.7 milliseconds frame period and n-bit intensity values, the time period is $16.7/(2^n-1)$ milliseconds In recent years, projection apparatuses which use a laser light source as the light source, have been proposed in order to achieve a greater brightness and a broader gamut of color reproduction in the image display and a miniaturization of the projection device. When a laser light source is used as light source, however, there is a possibility of the "speckle effect" occurring when projecting an image with a high degree of coherence in the laser light. The speckle effect is a speckled pattern caused by different lights reflected diffusely at various points of a projection surface, interfering with one another in irregular phase relationships.

FIG. 2 is a diagram illustrating an example of a projection image from an observer's perspective when a speckle effect occurs. A familiar example of the speckle effect is commonly observed in the appearance of a glare in the spot where a laser light is projected on a wall using a laser pointer.

The methods for eliminating a speckle effect in the projection apparatus using a laser light source mainly include the following.

1. The method for changing the occurrence of the speckle effect by changing the condition of a diffuse reflection on a projection surface, thereby making the speckle effect inconspicuous.

Specifically, U.S. Pat. No. 5,272,473 discloses a method for oscillating a projection screen. This method, however, physically drives a gigantic screen and is therefore faced with the problems of high cost and high power consumption.

2. The method for reducing the coherency of a laser light. Specific methods include:

(a) the method for causing the illumination light (i.e., laser light) from a laser light source to be reflected for a substantial number of times within an optical fiber. This method, however, lengthens the optical fiber and is therefore faced with limitations when miniaturizing the optical system.

(b) the method for dividing an illumination light path into a plurality thereof and changing the respective light path length, as disclosed in U.S. Pat. No. 6,249,381. This method, however, is faced with the problem in that it is difficult to make the optical system compact.

(c) the method for moving or rotating a diffuser placed in an illumination light path, as disclosed in U.S. Pat. Nos. 5,313,479, 6,594,090 and 6,874,893. This method, however, is faced with the problem that the usage efficiency of the laser light is reduced.

(d) the method for designing the generating frequency of a laser light to be as broad as possible (i.e., to have a "top hat" characteristic). This method, however, is faced with the problem that the design itself is technically very difficult.

The dither process or error diffusion method is a method for correcting a lack of gradation in an image. This is a method for artificially reproducing the gradation of one pixel on the basis of a plurality of pixels by utilizing the fact that the human eye has a low sensitivity to the fine part of an image, that is, the part with a high frequency. Therefore, an image displayed by applying, for example, a dither process in a projection apparatus appears totally different from an image represented by the original image data in terms of strictly observing it pixel by pixel, yet it can be viewed as the original image when viewing it from a distance so that the pixel size is not conspicuous.

FIG. 3A is a diagram exemplifying an image when it is displayed without applying a dither process; FIG. 3B is a diagram exemplifying an image when it is displayed by applying a dither process. As shown in the enlarged partial image 41 (FIG. 3A) and the enlarged partial image 42 (FIG. 3B), when the image is minutely viewed pixel by pixel, the image to which the dither process is applied is totally different from the original image to which a dither process is not applied. However, when the image is viewed from a distance so that the pixel size is not conspicuous, the image to which a dither process is applied appears similar to the original image, to which a dither process is not applied, as shown in the total image 43 (FIG. 3A) and the total image 44 (FIG. 3B).

FIG. 4 is a diagram describing an example of controlling a spatial light modulator (SLM) comprised in a projection apparatus when the image 43 shown in FIG. 3A is displayed. This control example exemplifies the case of controlling the individual pixel elements of the SLM by means of a PWM control, exemplifying the control for each frame period (T) of the pixel element corresponding to the pixels included in the partial image 45 within the image 43. Furthermore, the control exemplifies the case of reproducing the gray scale of the pixels included in the partial image 45 at the same level.

As shown in FIG. 4, according to the control example, each of the pixel elements corresponding to the pixels included in the partial image 45 is controlled under an ON state (noted as "turned ON" hereinafter for simplicity) during the period $t_2$ within one frame period, while it is controlled under an OFF state (noted as "turned OFF" hereinafter for simplicity) during the other periods $t_1$ and $t_3$ within the aforementioned one frame period. Furthermore, such a control during one frame period is repeated. As a result, each of the pixel elements corresponding to the pixels included in the partial image 45 is turned OFF in the period $t_1$, then turned ON in the period $t_2$ and turned OFF in the period $t_3$ during one frame period, and thereby the gradation of the partial image 45 per one frame period is obtained. Note that FIG. 4 shows the control example of four pixel elements (1, 2, 3 and 4) corresponding to the four pixels (pixels 1, 2, 3 and 4) within the partial image 45 as representatives. Furthermore, the figure expresses, by way of darkness, the gradation of each pixel included in the partial image 45 in each of the periods $t_1$, $t_2$ and $t_3$.

Furthermore, when the image 44 shown in FIG. 3B is displayed, the control for the SLM comprised in the projection apparatus can also be carried out in a similar fashion to the control example shown in FIG. 4, on the basis of image data after a dither process is applied. Even if a dither process is applied for correcting a lack of gradation in an image, the above described speckle effect may occur if a laser light source is used as the light source of the projection apparatus and if the image to be displayed is monotonous, such that the gradation of individual pixels are constant, as represented by the image 44.

SUMMARY OF THE INVENTION

In consideration of the situation as described above, the present invention aims at providing a projection apparatus for reducing the speckle with a simple and compact configuration in the projection apparatus implemented with a laser light source.

In order to accomplish the above described aim, a projection apparatus according to one aspect of the present invention includes a light source for projecting an illumination light through an illumination optical system to a spatial light modulator (SLM) for modulating the illumination light for generating and transmitting an image projection light to an image projection surface through a projection optical system to display an image. The projection apparatus further includes an image process unit for receiving and analyzing an input image data; and the image process unit applies a conversion process to a signal related to the input image data to generate different control patterns for a plurality of adjacent pixel elements included in the SLM for a predetermined period during at least one frame period to reproduce a gradation of the pixel whereby each of the plurality of adjacent pixel elements has a gradation of approximately a same level.

Further, a projection apparatus according to another aspect of the present invention includes a laser light source for emitting an illumination light through an illumination optical system for projecting to a spatial light modulation (SLM) for generating and transmitting a modulated light through a projection optical system to project the modulated light from the SLM onto a projection surface. The projection apparatus further includes: an image process unit for analyzing an input image; and the image process unit further performs a pseudo pixel conversion process for applying a conversion process to a signal related to the input image by temporally differentiating an algorithm of the conversion process for generating and displaying a gradation of a one pixel equivalent to the input image of a plurality of pixel elements included as part of the SLM.

BRIEF DESCRIPTION OF THE DRAWINGS

The present invention is described in detail below with reference to the following Figures.

FIGS. 1A and 1B are functional block diagram and a top view of a portion of a micromirror array implemented as a spatial light modulator for a digital video display system of a conventional display system disclosed in a related art patent;

DESCRIPTION OF THE PREFERRED EMBODIMENTS

The following is a description of the preferred embodiment of the present invention with reference to the accompanying drawings.

First Embodiment

A projection apparatus according to the first preferred embodiment of the present invention includes at least a laser light source for projecting an illumination light through an illumination optical system to a spatial light modulator (SLM) for modulating the illumination light for generating and transmitting an image projection light to an imaging projection surface through a projection optical system to display an image. The projection apparatus further comprises an image position change unit for changing a position of the image projected on an image projection surface. The image projection apparatus further includes a control unit for controlling the SLM and imaging position change unit, and a projection optical system for projecting the modulation light from the SLM onto the projection surface.

Figure 5:
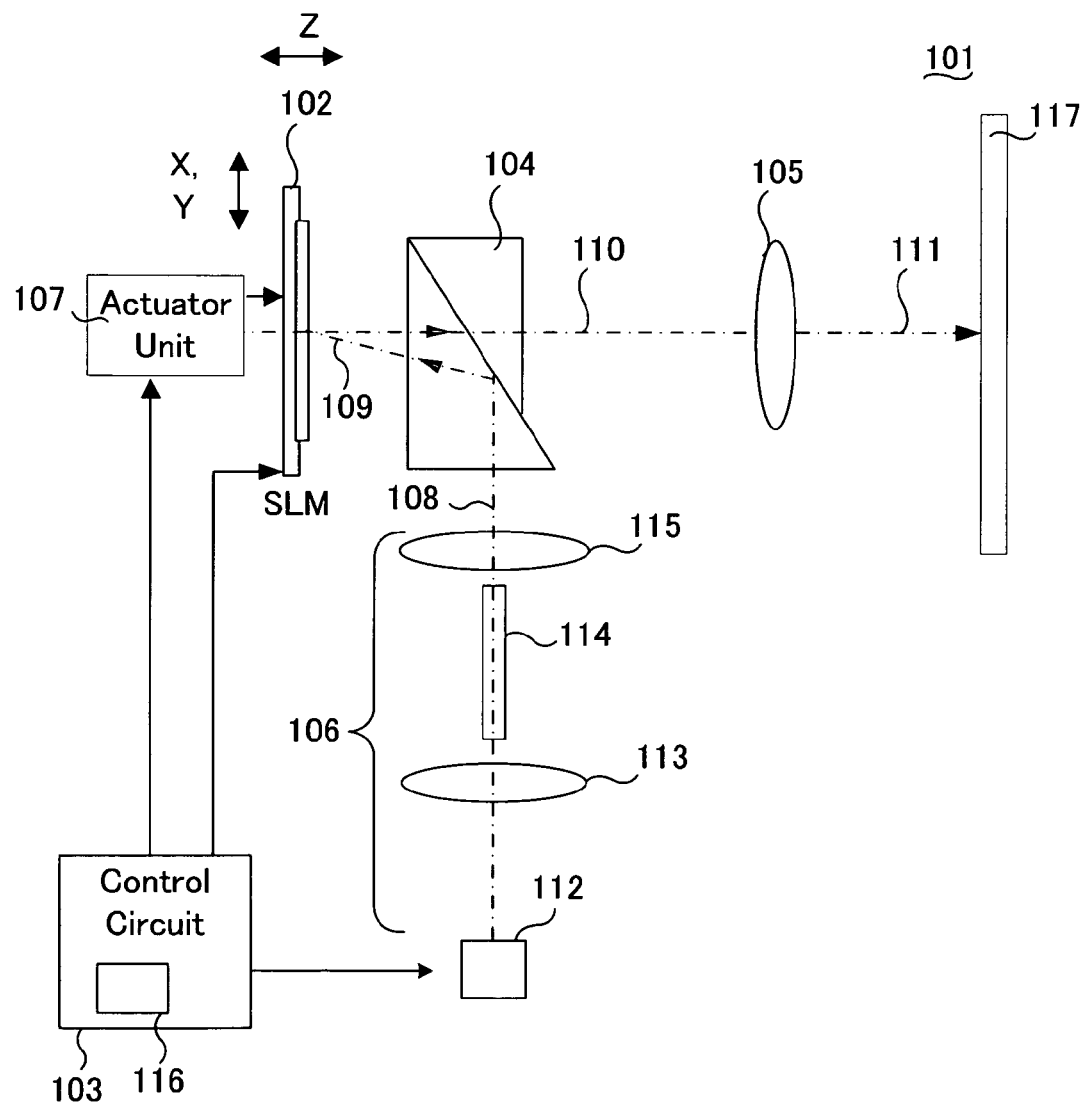
FIG. 5 is a diagram illustrating an exemplary configuration of a single-panel projection apparatus according to a first preferred embodiment.

FIG. 5 is a functional block diagram for illustrating an exemplary configuration of a single-panel projection apparatus according to the present embodiment. According to the present embodiment, FIG. 5 shows a projection apparatus 101 includes a light source optical system 106 for emitting an illumination light to a single spatial light modulator (SLM) 102. The SLM 102 receives control signals and controlled by a control circuit 103 for projecting a modulated light to a Total Internal Reflection (TIR) prism 104 then transmitted to a projection optical system 105 for projecting an image on an image display surface 117. The projection apparatus 101 further includes an actuator unit 107 for driving the SLM 102 that may be implemented as a micromirror device.

The SLM 102 and TIR prism 104 are displayed and aligned in the optical axis of the projection optical system 105. The light source optical system 106 is disposed with the optical axis aligned with the optical axis of the TIR prism 104.

The TIR prism 104 serves the functions of directing and transmitting an illumination light 108 emitted from the light source optical system 106 to enter the SLM 102 at a prescribed inclination angle relative thereto as incident light 109 and further directing and transmitting a reflection light 110 reflected and modulated as the modulation light from the SLM 102 to transmit to the projection optical system 105.

The projection optical system 105 projects the reflection light 110 reflected and modulated by the SLM 102 and transmitted through TIR prism 104 as the projection light 111 for projecting onto a screen 117.

The light source optical system 106 includes a laser light source 112 for generating the illumination light 108, a condenser lens 113 for focusing the illumination light 108, a rod type condenser body 114 and a condenser lens 115. Specifically, the illumination optical system includes the condenser lens 113, rod type condenser body 114 and condenser lens 115. These components, i.e., the laser light source 112, condenser lens 113, rod type condenser body 114 and condenser lens 115 are sequentially placed according to the above order in the optical axis of the illumination light 108 emitted from the laser light source 112 and incident to the side face of the TIR prism 104. The projection apparatus 101 employs a single SLM 102 for projecting and displaying a color image on the screen 117 by applying a color sequential display process.

More specifically, the laser light source 112 comprises a red laser light source, a green laser light source and a blue laser light source (not specifically shown here). The emission states of each color are independent controlled by dividing one frame of display data into a plurality of sub-fields. An exemplary method is to divide one frame into three sub-fields, that is, red (R), green (G) and blue (B) subfields. The light source is controlled to turn on the red laser light source, green laser light source and blue laser light source to emit each respective light in time period of the subfield designated for each color.

The actuator unit 107 is implemented as an exemplary embodiment of the image position change unit. The actuator unit 107 changes the spatial positions of the SLM 102 in one direction, or multiple directions along different axes such as axes along the X, Y and Z directions as shown in FIG. 5. The position of image projection on the screen 117 is changed when the image position change unit 107 changes the direction of the reflection light reflected as the modulation light 110 from the SLM 102. The X direction shown in FIG. 5 is perpendicular to the drawing surface.

Figure 6:
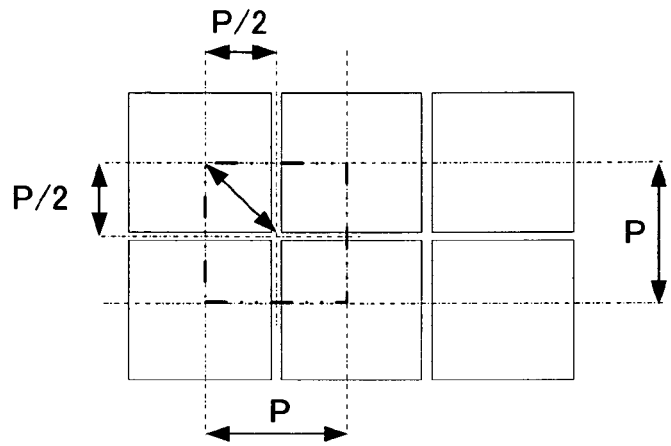
FIG. 6 is a diagram exemplifying the change amount of the imaging position of a reflection light on a screen.

As the actuator 107 of projection apparatus 101 controlled to operate SLM 102 alternately between the normal position and a position slightly shifted to the normal. When the SLM is controlled to operate alternately at a normal position and a position slightly shifted from the normal position, the image is projected alternately between the normal position and a position slightly shifted from the normal position. By controlling the slightly shift positions of the projected images on the projection screen thus changes the interference states of the laser light reflecting diffusely on the screen 117 thus reduces the occurrence of the speckle pattern. Specifically, in a specific embodiments, the spatial positions of the SLM are controlled to move within a spatial or temporal range to control the amount of position change with a change speed (i.e., the change cycle) for projecting the reflection light on the screen 117 such that the changes made to the projected images are not visually recognizable. In specific embodiments, the change amount of the image position can be set at, for example, a distance equivalent to one pixel, or less, of a projection image as shown in FIG. 6. The symbol "P" in FIG. 6 represents the length of one side of one pixel in a projection image. FIG. 6 illustrates the distance of position change is half of the pixel length, i.e., P/2 in the X and Y directions, respectively. Furthermore, the change of the image position may be controlled to have a frequency that is 120 Hz or higher. Furthermore, the distance of position change and the frequency of changes may be adjustable and may not be constant. A user may have the option to control and adjust the distance of position change and the frequency of changes.

The control circuit 103 controls the actuator unit 107, and also the SLM 102 and laser light source 112. The control circuit 103 may control the operations of these devices to have synchronous operations. Meanwhile, the control circuit 103 comprises an ON/OFF control unit 116 and a light source control unit (not specifically shown). The imaging position change function ON/OFF control unit 116 controls the switch over between turning ON and turning OFF the actuator unit 107 to change the spatial positions of the SLM 102 based on the image data for projecting an image onto the careen 117. Specifically, the light source control unit may be controlled to turn OFF the light source when the positions of the image projection on the image screen are moved in synchronous with the operation of the imaging position change unit. The image projection apparatus implemented with the synchronous control process can therefore prevent an extraneous light thus reduces the display of spectacles on the image display.

Figure 7:
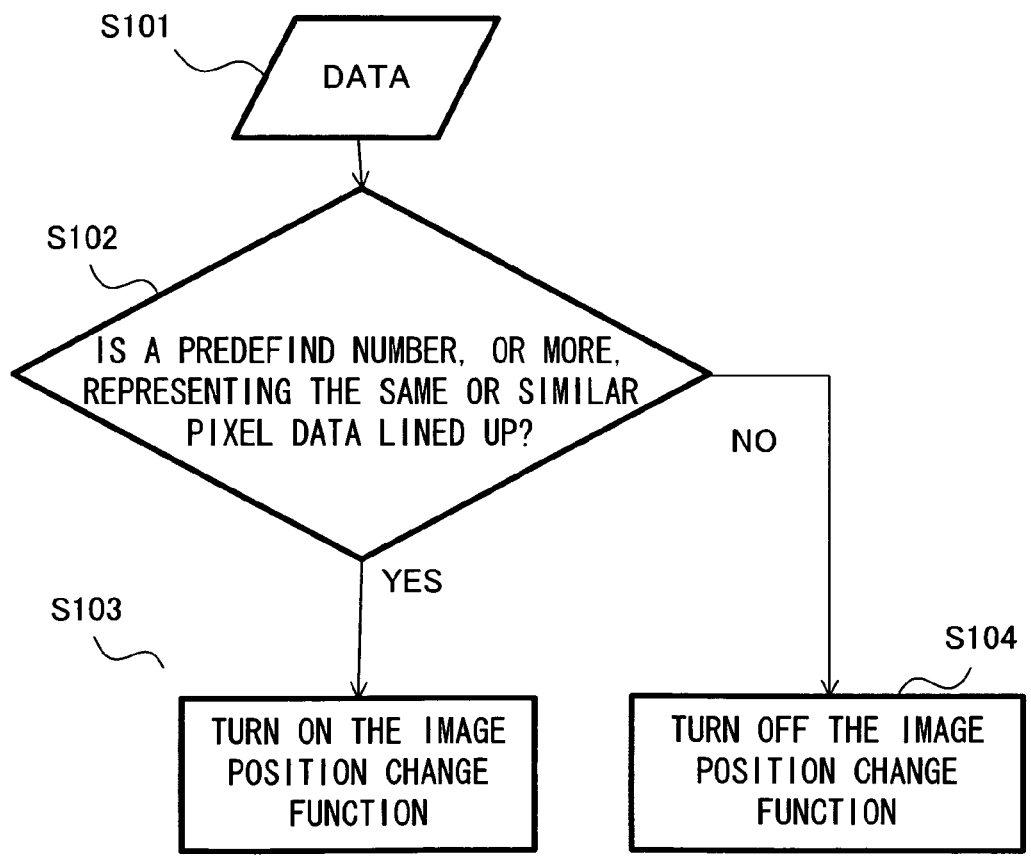
FIG. 7 is a flow chart showing an exemplary operation of an imaging position change function ON/OFF unit.

FIG. 7 is a flow chart for showing an exemplary operation process of the image position change function ON/OFF control unit 116. The operation process starts when the image data for displaying an image is received (step S101). The image position change function ON/OFF control unit 116 determines whether or not a predefined number of the same data or similar data is lined up in the input image data (step S102). If the result of the determination is "yes", the ON/OFF control unit 116 turns on the actuator unit 107 to perform the operation of changing the spatial positions of the above described SLM 102 (step S103). Conversely, the ON/OFF control unit 116 turns off the actuator unit 107 when the result of the determination is "no" and the position change operation is not carried out (step S104).

Note that the speckle on a display image tends to be conspicuous when the images are displayed with a very small amount of changes. Therefore, the process of a determination performed in the above-described step S102 makes it possible to determine whether or not the image according to the input image data is an image with a very small amount of change.

Specifically, if the result of the determination in step S102 is "yes", the images are expected to display with very small amount of changes. Otherwise, the images are expected to have significant changes thus the spectacles on the images would not be very obvious.

The above-described operation processes control the changes of the spatial positions of the SLM 102 only when the spectacles are expected to become obvious in displaying an image according to the image data. Therefore, to the operational processes as described can reduce the occurrence of the speckle pattern on the image display.

Figure 8:
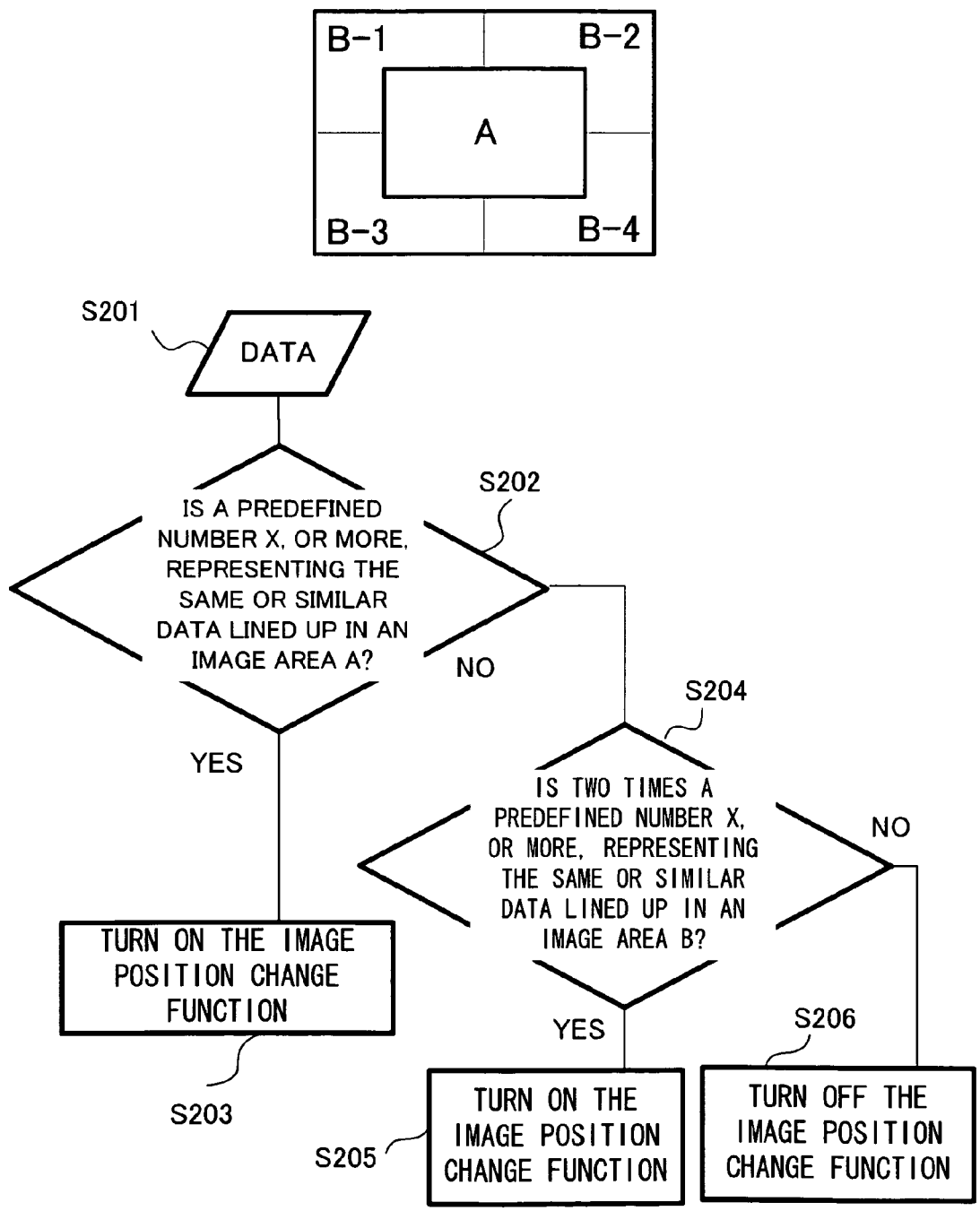
FIG. 8 is a diagram showing a flow chart showing another exemplary operation of an imaging position change function ON/OFF unit and exemplifying an area division.

FIG. 8 is a diagram showing a flow chart for showing another exemplary operation process of the imaging position change function ON/OFF control unit 116. FIG. 8 further shows exemplifying division of a display area. This exemplary operation process is configured to differentiate the determination criteria as to whether or not to activate the actuator unit 107 to perform the operation for changing the spatial positions of the SLM 102 in a plurality of areas. The processes are accomplished with a process of dividing the area of an image according to the input image data. Specifically, the description is provided for a case in which an image is divided into two areas. Specifically, the image area is divided into a central area A of the image and a peripheral area B in the peripheral area. The exemplary area division is illustrated on the upper side of the drawing. The method of dividing an image area, however, is flexible. Note that the area B may be further divided into areas B-1, B-2, B-3 and B-4.

As shown in the flow chart in the lower part of FIG. 8, when the image data for displaying an image is received (step S201), the imaging position change function ON/OFF control unit 116 divides the image area according to the image data into two areas. The process first determines whether or not a predefined number X of the same or similar data is lined up in the image data of the area A (step S202). The ON/OFF control unit turns on the actuator unit 107 to perform the operation for changing the spatial positions of the SLM 102 (step S203) if the result of the determination is "yes".

In contrast, if the result of the determination is "no", the image position change function ON/OFF control unit 116 then determines whether or not two times, or more, of the predefined number X of the same or similar data is lined up in the image data of the area B (step S204). The ON/OFF control units activates the actuator unit 107 to perform the operation for changing the spatial positions of the SLM 102 (S205) if the result of the determination is "yes". The actuator unit 107 is turned OFF if the result of the determination is "no" and the process of position changes driven by the actuator unit 107 is not performed (Step S206).

The image projection apparatus implemented with the above-described operation processes can apply the result of the determination of the changes of the images among different sub-areas to control the operation processes of changing the SLM 102. Therefore, to the control process can apply a determination criterion that more likely activate the operation of the actuator unit 107 for changing the spatial positions of the SLM 102 in the area close to the center of an image. The central area is likely to have a high frequency of appearance of the main (photographic) object than for the area B, as in the case of the present exemplary operation.

More specifically, the step S102 of FIG. 7, and the steps S202 and S204 of FIG. 8, may be carried out to determine whether or not a predefined number, or more, of the same or similar data is lined up in image data. The determination may be carried out by determining whether or not a predefined number, or more, of pixels having the same or similar color data is lined up in the image based on the coordinate data and color data of each pixel of an image according to the image data.

As described above, the turning ON/OFF of the operation for shifting the image positions on the basis of the input image data provides further advantages. The image projection system implemented with such operational processes can avoid problems of extra power consumption and a reduction in the resolution due to continuous shifts of the pixels.

Figure 9A:
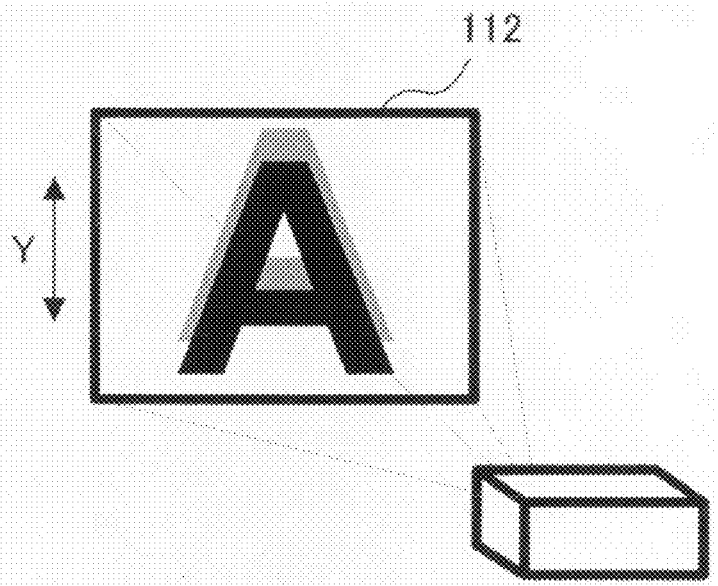
FIG. 9A is a first diagram illustrating an exemplary change of an imaging positions, on a screen, of the reflection light from the SLM (i.e., the modulation light) when an operation of an actuator unit changing the spatial positions of the SLM is carried out.
Figure 9B:
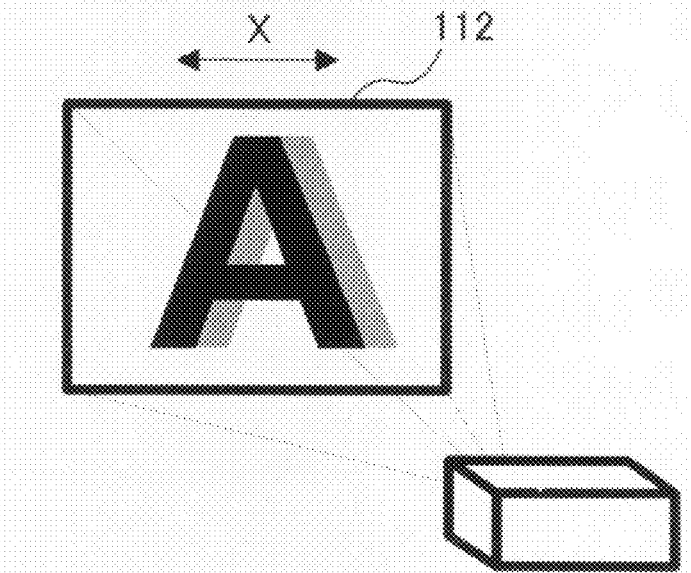
FIG. 9B is a second diagram illustrating an exemplary change of an imaging positions, on a screen, of the reflection light from the SLM (i.e., the modulation light) when an operation of an actuator unit changing the spatial positions of the SLM is carried out.

FIGS. 9A, 9B and 9B are diagrams for illustrating an exemplary change of an image positions, on a screen 117 by shifting the reflection light (i.e., the modulation light) 110 reflected from the SLM 102 when an operation of an actuator unit 107 changing the spatial positions of the SLM 102 is carried out.

The exemplary change of the imaging position shown in FIG. 9A shows the change of the image positions of the reflection light (i.e., the modulation light) 110 on the screen 117 in the Y direction as a result of the actuator unit 107 changing the spatial positions of the SLM 102 in the Y direction.

FIG. 9B shows the change of the image position on the screen 117 in the X direction by changing the imaging positions of the reflection light (i.e., the modulation light) 110 as a result of the actuator unit 107 changing the spatial positions of the SLM 102 in the X direction.

FIGS. 9A and 9B also show the change of direction of the imaging positions of the reflection light (i.e., the modulation light) from the SLM 102 on the screen 117 that is a direction perpendicular to the optical axis of the projection optical system 105.

Figure 9C:
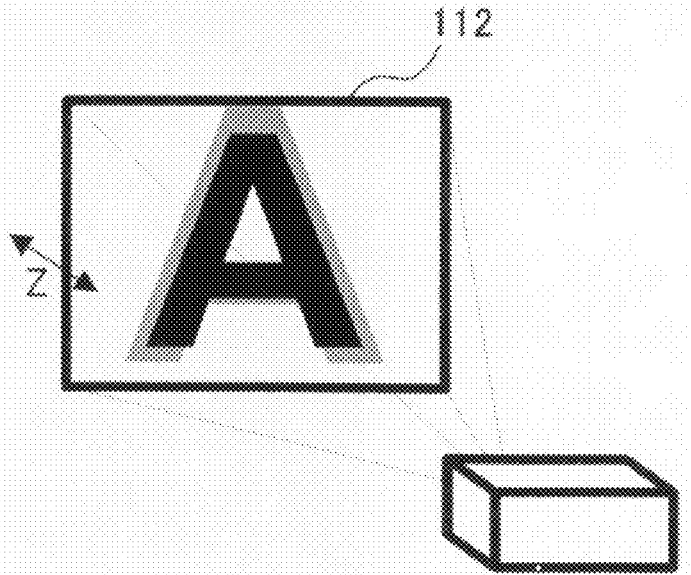
FIG. 9C is a third diagram illustrating an exemplary change of an imaging positions, on a screen, of the reflection light from the SLM (i.e., the modulation light) when an operation of an actuator unit changing the spatial positions of the SLM is carried out.

FIG. 9C shows the change of the image positions of the reflection light (i.e., the modulation light) 110 on the screen 117 in the Z direction as a result of the actuator unit 107 changing the spatial positions of the SLM 102 in the Z direction. This shows the change of direction of the image position is parallel to the optical axis of the projection optical system 105.

The above-described FIGS. 9A through 9C illustrate the change of the image positions of the reflection light (i.e., the modulation light) 110 from the SLM 102 on the screen 117 along a one-dimensional direction. The change of the image positions of the reflection light (i.e., the modulation light) 110 from the SLM 102 on the screen 117 may also be controlled to move in along a plane as a two-dimensional position change (e.g., the XY direction). The image position change may be controlled to move along a three-dimensional direction (i.e., the XYZ direction). The multiple dimensional changes may be accomplished by changing the spatial position of the SLM 102 in the two dimensional direction (e.g., the XY direction) or in the three dimension (i.e., the XYZ direction).

As described above, the projection apparatus 101 is configured to change the physical or optical positions of the SLM 102 to slightly change the image positions of the modulation light 119 to project a modulated light from the SLM 102 onto the screen 117. The image position change also changes the interference states of the laser light diffusely reflected on the screen 117 to reduce the occurrence of the speckle effect.

FIG. 5 shows the projection apparatus configured as a single-panel projection apparatus. The projection apparatus can be configured as a multi-panel projection apparatus implemented with a plurality of SLMs 102.

Figure 10:
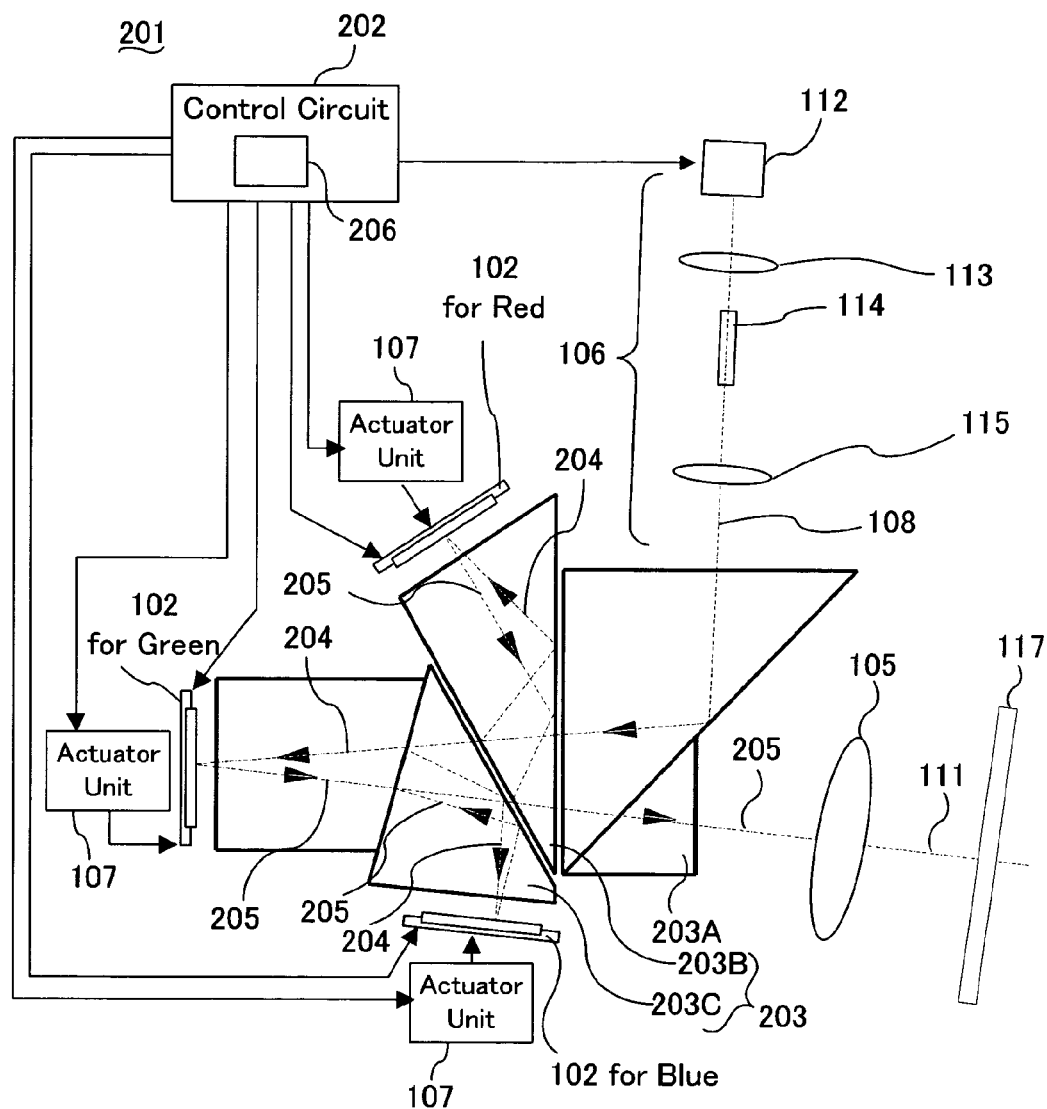
FIG. 10 is a diagram illustrating an exemplary configuration of a multi-panel projection apparatus according to a first preferred embodiment.

FIG. 10 is a functional block diagram for illustrating an exemplary configuration of a multi-panel projection apparatus according to the present embodiment.

As shown in FIG. 10, the projection apparatus 201 is a three-panel projection apparatus that operates with three SLMs 102. Each of these SLMs includes an actuator unit 107. The projection apparatus 201 is a three-panel projection apparatus that has different control processes and operational sequences from the above-described projection apparatus 101. The control circuit 202 is different from and carries out different control processes than that of the control circuit 103.

The control circuit 202 includes an image position change function ON/OFF control unit 206 for controlling a changeover of switching ON and OFF of each actuator unit 107 for controlling the operation for changing the spatial positions of the corresponding SLM 102. Note that the image position change function ON/OFF control unit 206 controls the changeover of the ON and OFF operations for either one, two or three of the three actuator units 107. Furthermore, the control circuit 202 can also control the three actuator units 107, three SLMs 102 and laser light source 112 to operate synchronously.

The projection apparatus 201 includes a light separation/synthesis optical system 203 disposed between the projection optical system 105 and individual SLMs 102. The light separation/synthesis optical system 203 comprises a plurality of TIR prisms, i.e., TIR prism 203A, TIR prism 203B and TIR prism 203C. The TIR prism 203A serves the function of guiding the illumination light 108 incident from the side of the optical axis of the projection optical system 105 to the SLM 102 as incident light 204. The TIR prism 203B serves the functions of separating red (R) light from an incident light 204 incident by way of the TIR prism 203A and transmitting the red light incident to the SLM 102 designated to modulate the red light, and also serves the function of guiding the reflection light 205 of the red light to the TIR prism 203A.

Likewise, the TIR prism 203C serves the functions of separating blue (B) and green (G) lights from the incident light 204 transmitted through the TIR prism 203A and directs the light to project to the blue color-use SLM 102 and green color-use SLM 102. The TIR prism 203C further serves the function of guiding the reflection light 205 of the green light and blue light to the TIR prism 203A.

Therefore, the spatial light modulations of three colors R, G and B are simultaneously performed at the three SLMs 102. The reflection lights generated from the respective modulations are projected onto the screen 117 as the projection light 111 through the projection optical system 105 to display a color image.

The imaging position change function ON/OFF control unit 206 in the of the projection apparatus 201, apply the image data to control the three actuator unit 107 to perform the operation for changing the spatial positions of the corresponding SLM 102. The change of image projection positions further changes the interference states of the laser light reflecting diffusely on the screen 117 thus reduces the occurrence of a speckle effect. The advantages of the operational processes as described is the same as the operation shown in FIG. 7 or FIG. 8 performed by the image position change function ON/OFF control unit 116 shown in FIG. 5.

The multi-panel projection apparatus can be configured to have each SLM 102 with one actuator unit 107 similar to the projection apparatus 201. The control processes may also be applied for image projection apparatus with at least one or more SLM 102 operated with one actuator unit 107.

Figure 11:
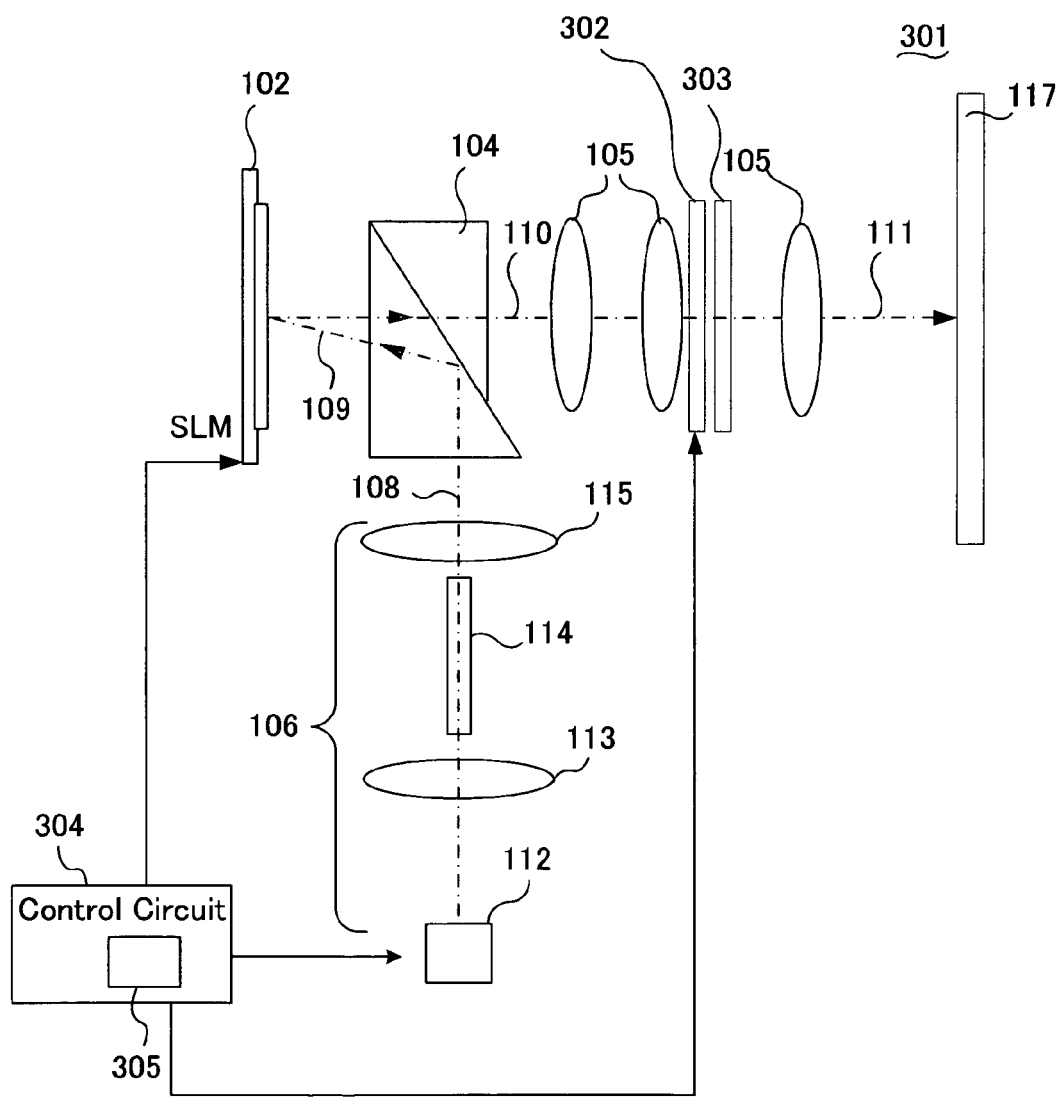
FIG. 11 is a diagram illustrating another exemplary configuration of a single-panel projection apparatus according to a first preferred embodiment.

FIG. 11 is a functional block diagram for illustrating another exemplary configuration of a single-panel projection apparatus according to the present embodiment.

The projection apparatus 301 shown in FIG. 11 has a different configuration for changing the image positions by projecting the reflection light, i.e., the modulated light from the SMM 102, on the screen 117 The image projection apparatus is different from the above-described projection apparatus 101 shown in FIG. 5. Instead of implementing the actuator unit 107 as the above described imaging position change unit, the projection apparatus 301 includes a polarization converter 302 and a birefringent plate 303 in the light path of the projection optical system 105. Note that FIG. 11 depicts the projection optical system 105 includes a plurality of projection lenses that is different from the configuration shown in FIG. 5 for convenience of description.

The polarization converter 302 and birefringent plate 303 are an exemplary light path conversion unit for changing the optical positions of the optical axis of the reflection light (i.e., the modulation light) from the SLM 102. The polarization converter 302 is an element for converting the polarizing direction of the incident light for transmitting a light with a different polarization. The birefringent plate 303 is an element with differentiating refractive indices depending on the polarizing direction of the incident light. The polarization converter 302 may be implemented with a liquid crystal display (LCD) or a wavelength selective polarization element for converting the polarizing direction of the light with a specific wavelength. Meanwhile, as the image projection apparatus now implemented with the polarization converter 302 and birefringent plate 303 can generate a shift in the optical axis depending on a polarizing direction. The optical axis shifting mechanism is similar to a technique disclosed in a Japanese Registered Patent No. 2813041 by combining an LCD panel and a birefringent plate.

Furthermore, the projection apparatus 301 comprises a control circuit 304 to substitute the above-describe control circuit 103 with other optical components and controlling circuits similar to those of the projection apparatus 101.

The polarization converter 302 and birefringent plate 303 of the projection apparatus 301 are implemented to change the optical positions of the optical axis of the reflection light (i.e., the modulation light) from the SLM 102. The changes made to the optical axis of the reflection light from the SLM further changes the positions of image projection onto the screen 117 projected by the reflection light 110 from the SLM 102.

Figure 12:
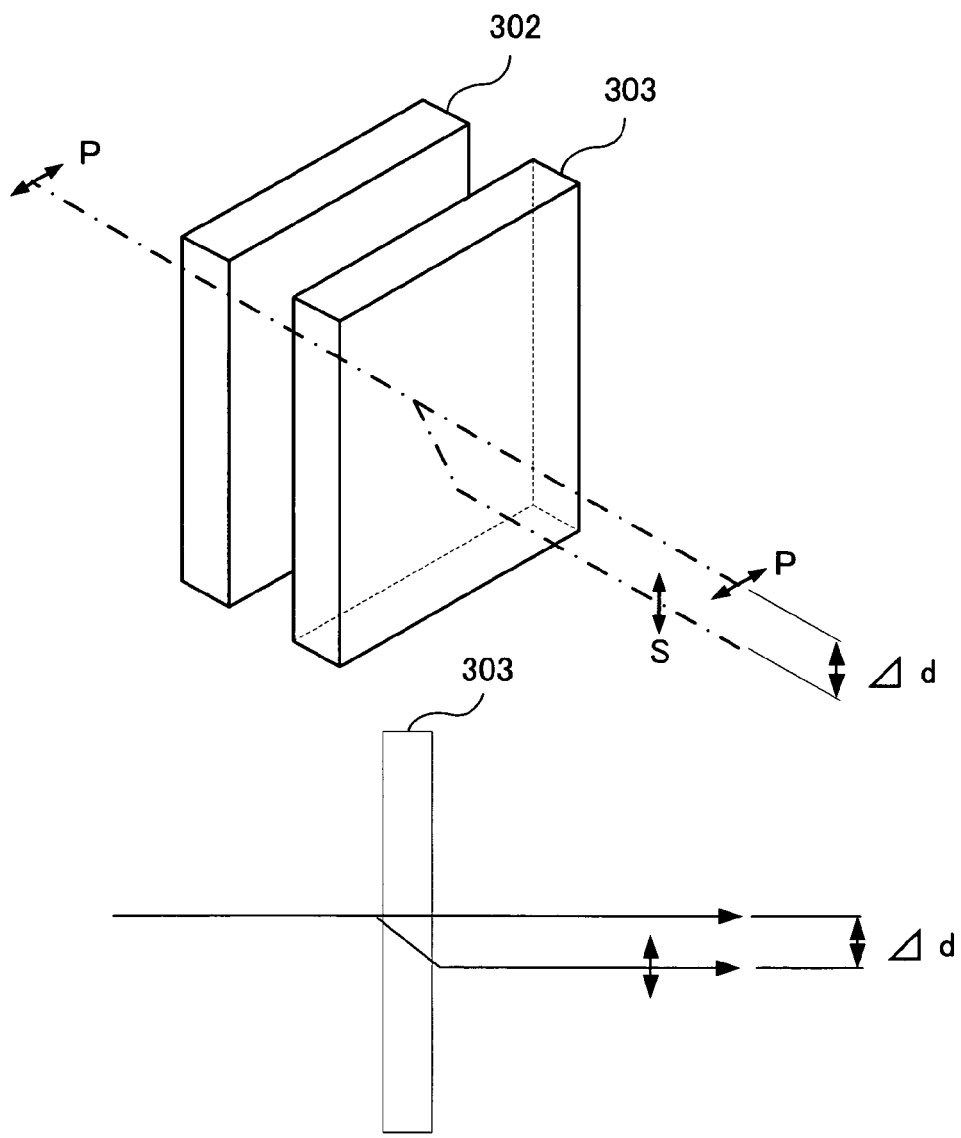
FIG. 12 is a diagram describing an exemplary operation of a polarization converter and that of a birefringent plate.

FIG. 12 is a diagram for showing a perspective view for describing an exemplary operation of the polarization converter 302 and that of birefringent plate 303. FIG. 12 shows a polarization converter 302 for outputting an input P-polarized light and also converting the input P-polarized light into an S-polarized light. The birefringent plate 303 transmits an incident light with a P-polarization without changing the optical position of the optical axis of the incident light. The birefringent plate 303 shifts the optical position of the optical axis of the incident light by $\Delta d$ if the polarizing direction of the incident light is an S-polarization.

The polarization converter 302 converts the light incident to the polarization converter 302 uniformly. For example, in every predetermined cycles, the polarization converter 302 converts a P-polarized light from the P-polarization into S-polarization and the operation thus shift the optical axis of the reflection light from the SLM and changing the position of the image projected onto the screen 117. In alternately designated cycles, the polarization converter is turned off and not converting the polarization of the incident light to maintain a normal imaging position of the reflection light on the screen 117. The control process for controlling the polarization conversion to slightly shift the image projection from the normal position can therefore change the interference states of the laser light reflecting diffusely on the screen 117. The control process with the polarization conversion can therefore reduce the occurrence of the speckle effect. Specifically, the above-noted Δd and the predetermined cycle are controlled within the range to limit the distance of position changes and change speed (i.e., change cycle) such that the image displayed on the screen would not be visually observable by the humane eyes. In this case, the distance of the position changes of the image projected onto the display screen 117 is limited within a distance equivalent to or smaller than one pixel in the projected image. Furthermore, the change cycle can be set, for example, at 120 Hz or higher. Note that the speed of the change cycles may be controllable and adjustable to allow a user to flexibly set instead of setting at a predetermined value.

The polarization converter 302, SLM 102 and laser light source 112 are controlled by the control circuit 304. The control circuit 304 may control these devices to operate in a coordinated and synchronous manner. Meanwhile, the control circuit 304 includes an imaging position change function ON/OFF control unit 305. The imaging position change function ON/OFF control unit 305 control the changing over between turning ON and OFF the above-described polarization converter 302. The turning ON and OFF of the polarization converter to activate or deactivate the operation for converting the polarizing direction from the P-polarization into S-polarization is depending on the image data related to an image projecting on the screen 117. This control processes are carried out in a similar manner to the operation described with reference to the above-described FIGS. 7 and 8. For example, in the case of carrying out a control process similar to the operation of FIG. 7, the control process may control the polarization converter 302 to perform the conversion operation if the result of the determination according to step S102 is "yes". Conversely, the polarization converter 302 is turned OFF if the result of the determination is "no". Meanwhile, in carrying out the control process similar to the operation described in FIG. 8, the control process turn ON the polarization converter 302 to perform the conversion operation if the result of the determination of S202 is "yes". Conversely, if the result of the determination of the step S204 is "no", the polarization converter 302 is turned OFF.

Accordingly, the polarization converter 302 and birefringent plate 303 now implemented in the projection apparatus 301 is configured to change the optical positions of the optical axis of the reflection light (i.e., the modulation light) from the SLM 102 to slightly change the imaging positions of the modulation light from the SLM 102 on the screen 117. The changes of the image projected on the screen further change the interference states of the laser light reflecting diffusely on the screen 117 thus reducing the occurrence of the speckle effect.

While FIG. 11 shows the projection apparatus as an exemplary configuration with a single-panel projection apparatus, the polarization converter may also be implemented in an image projection apparatus with multiple SLMs generally know as multi-panel projection apparatus.

Figure 13:
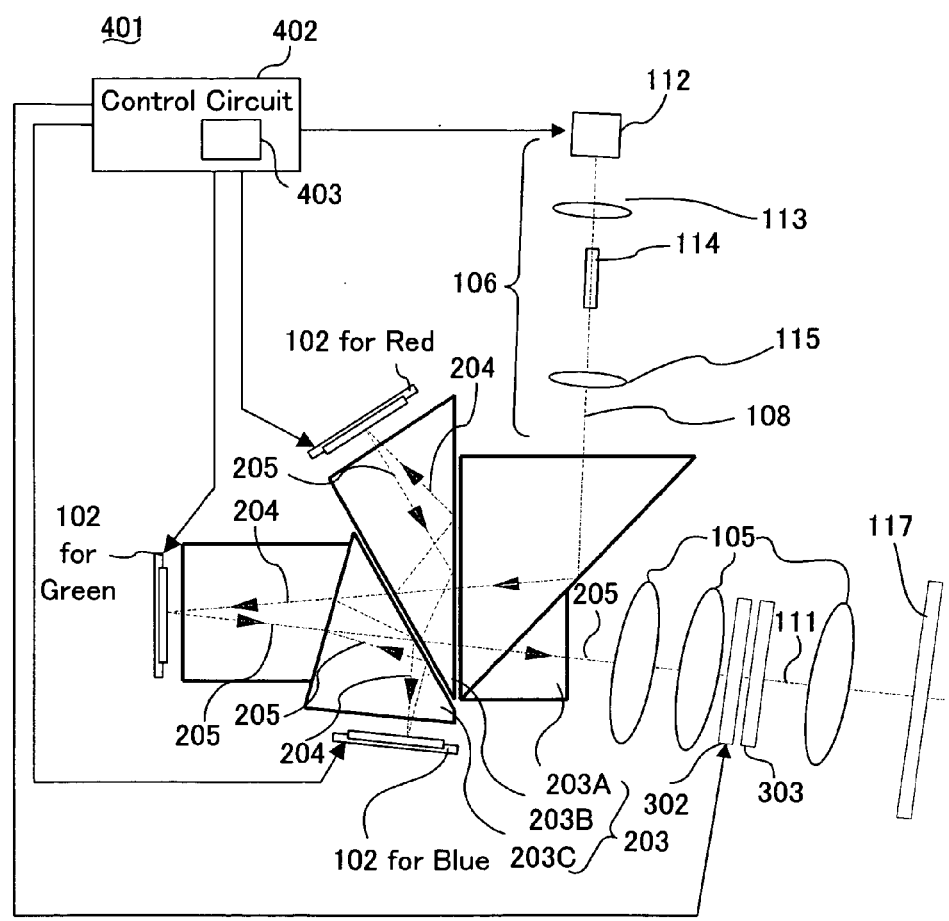
FIG. 13 is a diagram illustrating another exemplary configuration of a multi-panel projection apparatus according to a first preferred embodiment.

FIG. 13 is a functional block diagram for illustrating another exemplary configuration of a multi-panel projection apparatus according to the present embodiment.

FIG. 13 shows projection apparatus 401 that is different from the above described projection apparatus 301. The projection apparatus is generally known as a three-panel projection apparatus comprising three SLMs 102. Furthermore, the projection apparatus 401 comprises a control circuit 402 to serve substantially similar functions as the carried out by the control circuit 304.

The control circuit 402 controls the polarization converter 302, three SLMs 102 and laser light source 112. The control process further controls these devices to operate in a coordinated and synchronous manner. Furthermore, the control circuit 402 includes an imaging position change function ON/OFF control unit 403 for controlling the changeover between turning ON and OFF a function of converting the polarizing direction from the P-polarization into S-polarization carried out by the polarization converter 302.

The light source optical system 106, light separation/synthesis optical system 203 and projection optical system 105 are similarly configured as described with reference to the above-described FIG. 10 and therefore the description is not repeated here.

The projection apparatus 401 is also configured such that the image position change function ON/OFF control unit 403 turns ON the polarization converter 302 to perform the operation for converting the polarizing direction from the P-polarization into S-polarization based on the input image data. The criterion for turning on the polarization converter is the same as the operation performed by the image position change function ON/OFF unit 305 shown in FIG. 11. The polarization changes shift the optical axis of the projection light thus changing the interference states of the laser light reflecting diffusely on the screen 117 thus reducing the occurrence of the speckle effect.

The projection apparatus according to the present embodiment can also be modified as follows in addition to the above-described configurations.

Instead of the actuator unit 107, polarization converter 302 and birefringent plate 303 to serve the function of changing the image position as described above, the projection apparatus according to the present embodiment may implement an actuator unit for changing the spatial positions of at least one of the optical members as part of the projection optical system 105. The actuator unit for changing the spatial positions of at least one of the optical members can change the image positions of the reflection light (i.e., the modulation light) 110 from the SLM 102 on the screen 117.

In the meantime the projection apparatus according to the present embodiment may also have a control process such that the determination criteria (e.g., the determination criteria for the above-described S102, S202 and S203) for turning ON/OFF the image position change function ON/OFF control units for changing over between turning ON and OFF the imaging position change unit to change the imaging positions includes the result of comparing images between images of the consecutive frames related to the image to be projected.

Furthermore, the projection apparatus according to the present embodiment may include an actuator unit for driving the screen 117 as a projection surface. The change direction of the imaging positions performed by the above-described imaging position change unit is different from the drive direction of the screen 117 performed by the added actuator unit. The configuration and the control processes can reduce the amplitude of driving the screen 117. The position change may be smaller than the above-described configuration of reducing the occurrence of the speckle effect only by driving a screen and reduce the size of the apparatus. More specifically, when such configuration and control processes are implemented, the direction of the image position change unit to change the image positions is controlled to operate in a reverse direction relative to the direction of the actuator unit driving the screen 117.

Furthermore, the projection apparatus according to the present embodiment may also be configured to combine the configuration of a second or third embodiment described below.

As described above, the projection apparatus according to the present embodiment can reduce the occurrence of the speckle effect with the simple and compact device configuration in the projection apparatus implemented with a laser light source.

Second Embodiment

A projection apparatus according to a second preferred embodiment of the present invention includes at least laser light source for emitting an illumination light to transmit through an illumination optical system for projecting to a spatial light modulator (SLM) for modulating the illumination light to generate a modulated light to transmit through a projection optical system for projecting the modulated light to a projection surface. The image projection apparatus further includes an image process unit for analyzing an input image. Furthermore, the image process unit carries out a pseudo pixel conversion process for converting a signal related to an input image to display a gradation equivalent to one pixel of the input image using a plurality of pixel elements of the SLM 102 and for temporally differentiating the algorithm of the aforementioned conversion process.

Figure 14:
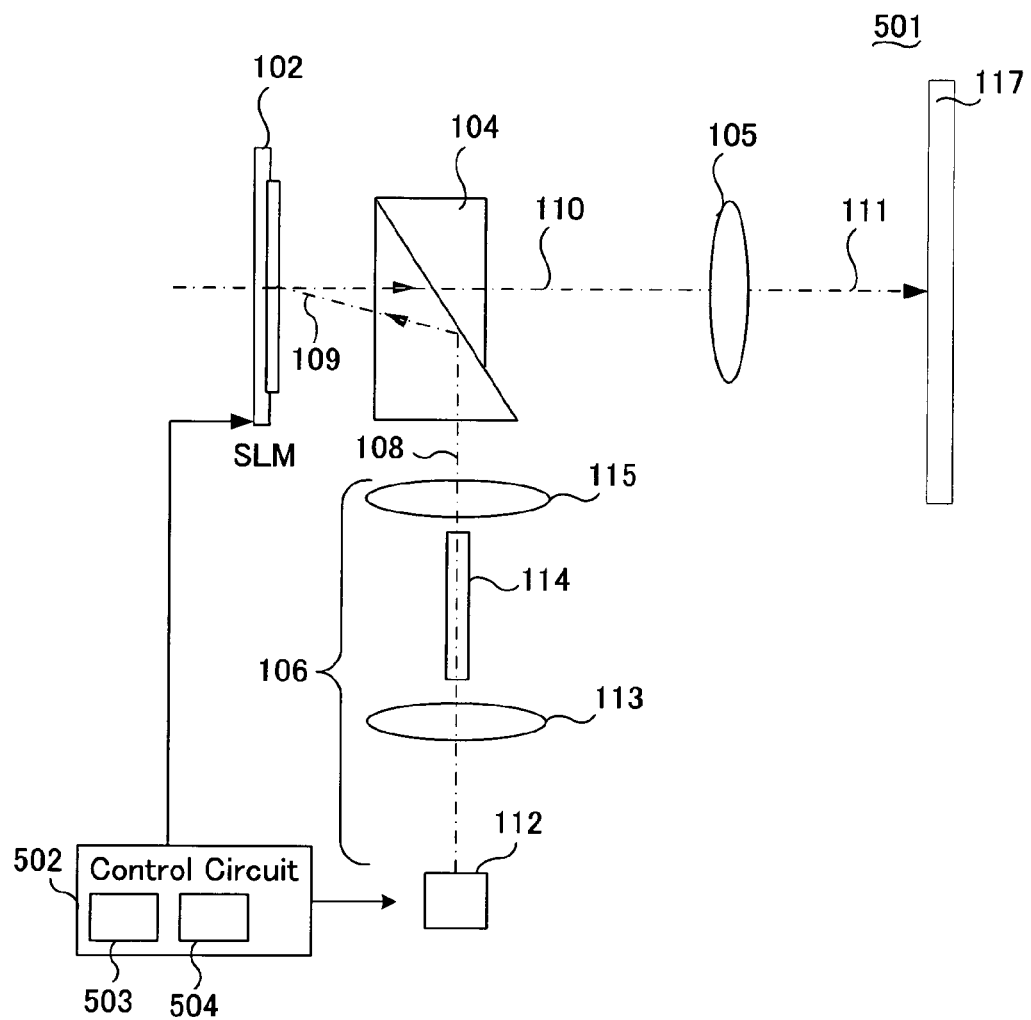
FIG. 14 is a diagram illustrating an exemplary configuration of a single-panel projection apparatus according to a second preferred embodiment.

FIG. 14 is a functional block diagram for illustrating an exemplary configuration of a single-panel projection apparatus according to the present embodiment.

As shown in FIG. 14, the projection apparatus 501 does not include an actuator unit 105 and therefore is different from the projection apparatus 101 shown in FIG. 5 Furthermore, the projection apparatus 501 comprises a control circuit 502 instead of the control circuit 103 shown in FIG. 5. Other optical components and control circuits are the same as that implemented in the apparatus shown in FIG. 5 and therefore the description is not repeated here.

The control circuit 502 includes an image process unit 503 and pseudo pixel conversion function ON/OFF control unit 504.

The image process unit 503 analyzes a signal related to an externally input image (i.e., an input image) that constitutes a projection image. This process includes a pseudo pixel conversion process for performing a conversion process for a signal related to an input image to display a gradation equivalent to one pixel of the input image using a plurality of pixel elements included as part of the SLM 102 and for temporally differentiating the algorithm of the aforementioned conversion process. According to the present embodiment, a dither process is applied to the algorithm of the pseudo pixel conversion process in a predetermined cycle.

The pseudo pixel conversion function ON/OFF control unit 504 controls the changeover between turning ON and OFF the image process unit 503 to carry out the pseudo pixel conversion process on the basis of the projection image data that is the signal related to the input image. The changeover control can be carried out in a similar manner as the operation described with reference to FIGS. 7 and 8. In the case of performing the changeover control similar to the operation described with reference to FIG. 7, the image process unit 503 is activated to perform the pseudo pixel conversion process if the result of the determination in step S102 is "yes", while the image process unit 503 is deactivated and the pseudo pixel conversion process is not carried out if the result of the determination is "no". Furthermore, in the case of performing the changeover control similar to the operation described with reference to FIG. 8, the image process unit 503 is activated to perform the pseudo pixel conversion process if the result of the determination of step S202 is "yes", or if the result of the determination in step S204 is "yes", while the image process unit 503 is deactivated and the pseudo pixel conversion process is not carried out if the result of the determination in step S204 is "no".

The control circuit 502 controls the SLM 102 and laser light source 112. For instance, when the pseudo pixel conversion function ON/OFF control unit 504 controls the image process unit 503 to turn OFF the pseudo pixel conversion process, the control circuit 502 controls the SLM 102 and laser light source 112 on the basis of the data after the pseudo pixel conversion process is applied thereto. More particularly, the control circuit 502 controls the individual pixel elements of the SLM 102 by applying a pulse-width modulation (PWM) process. Furthermore, the control circuit 502 controls the image process unit 503, SLM 102 and laser light source 112 to operate in a coordinated and synchronized manner.

Figure 15:
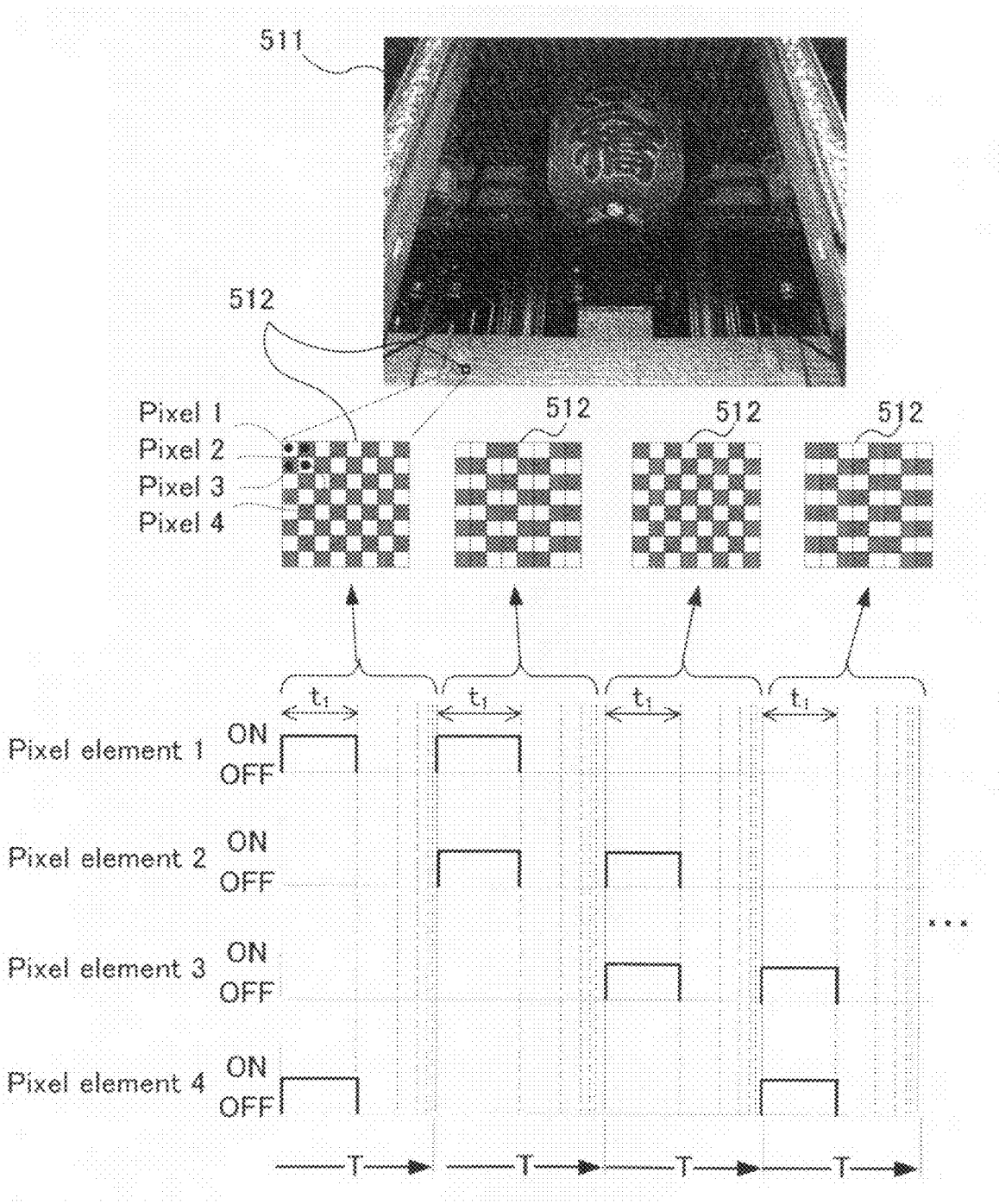
FIG. 15 is a diagram describing an exemplary control of an SLM when an image is displayed on the basis of data after an image process unit applying a pseudo pixel conversion process.

FIG. 15 shows a timing diagram for describing an exemplary control of the SLM 102 when an image is displayed on the basis of data after the image process unit 503 applies a pseudo pixel conversion process.

FIG. 15 shows an exemplary control process carried out for each four-frame period in the four pixel elements 1, 2, 3 and 4 that correspond to four adjacent pixels 1, 2, 3 and 4. These pixels represent a plurality of pixels as part of the partial image 512 within the image 511 to be displayed. Note that one frame period is represented by "T" in FIG. 15. Although not specifically shown, the control process applied for the four pixel elements corresponding to the other mutually adjacent four pixels included in the partial image 512 (e.g., four pixel elements corresponding to two pixels on the right next neighbor to the pixel 2 and to two pixels on the right next neighbor to the pixel 4) is also carried out in a similar manner.

Furthermore, in the exemplary control process, the image process unit 503 performs the pseudo pixel conversion process for a plurality of pixel elements as part of the partial image 512 as follows. Specifically, a conversion process for a signal related to an input image is carried out. A control process is carried out such that the algorithm of the aforementioned conversion process is differentiated for each one frame period in the continuous four-frame period, so that the gradation corresponding to one pixel of the input image is displayed using four pixel elements (e.g., pixel elements 1, 2, 3 and 4) corresponding to the mutually adjacent four pixels (e.g., pixels 1, 2, 3 and 4).

FIG. 15 shows the images displayed with image data generated by the pseudo pixel conversion process performed by the image process unit 503, the pixel elements 1 and 4 are turned ON and the pixel elements 2 and 3 are turned OFF during the period $t_1$ within the first frame period;

the pixel elements 1 and 2 are turned ON and the pixel elements 3 and 4 are turned OFF during the period $t_1$ within the second frame period;

the pixel elements 2 and 3 are turned ON and the pixel elements 1 and 4 are turned OFF during the period $t_1$ within the third frame period; and the pixel elements 3 and 4 are turned ON and the pixel elements 1 and 2 are turned OFF during the period $t_1$ within the fourth frame period.

Note that the gradation of each pixel within the partial image 512 in each frame period is expressed by the darkness in the drawing.

By applying the conversion process, a gradation gained by turning ON one pixel for the period "$t_1/2$" is obtained as a gradation per frame period corresponding to one pixel of the input image using the four pixel elements including the pixel elements 1, 2, 3 and 4.

As described above, the projection apparatus 501 is configured to display an image according to data generated by the pseudo pixel conversion process performed by the above described image process unit 503. Therefore, the gradations of individual pixels of the image to be displayed, as shown in FIG. 15, are never continuously constant even when a monotonous image in which the gradations of individual pixels are continuously constant. Therefore, the interference states of the laser light reflecting diffusely on the screen 117 are temporally changed and, as a result, the occurrence of the speckle effect can be reduced.

Note that the projection apparatus according to the exemplary configuration shown in FIG. 15 is configured as a single-panel projection apparatus. It is well understood that however, the image projection apparatus may be configured as multi-panel projection apparatus comprising a plurality of SLM 102.

Figure 16:
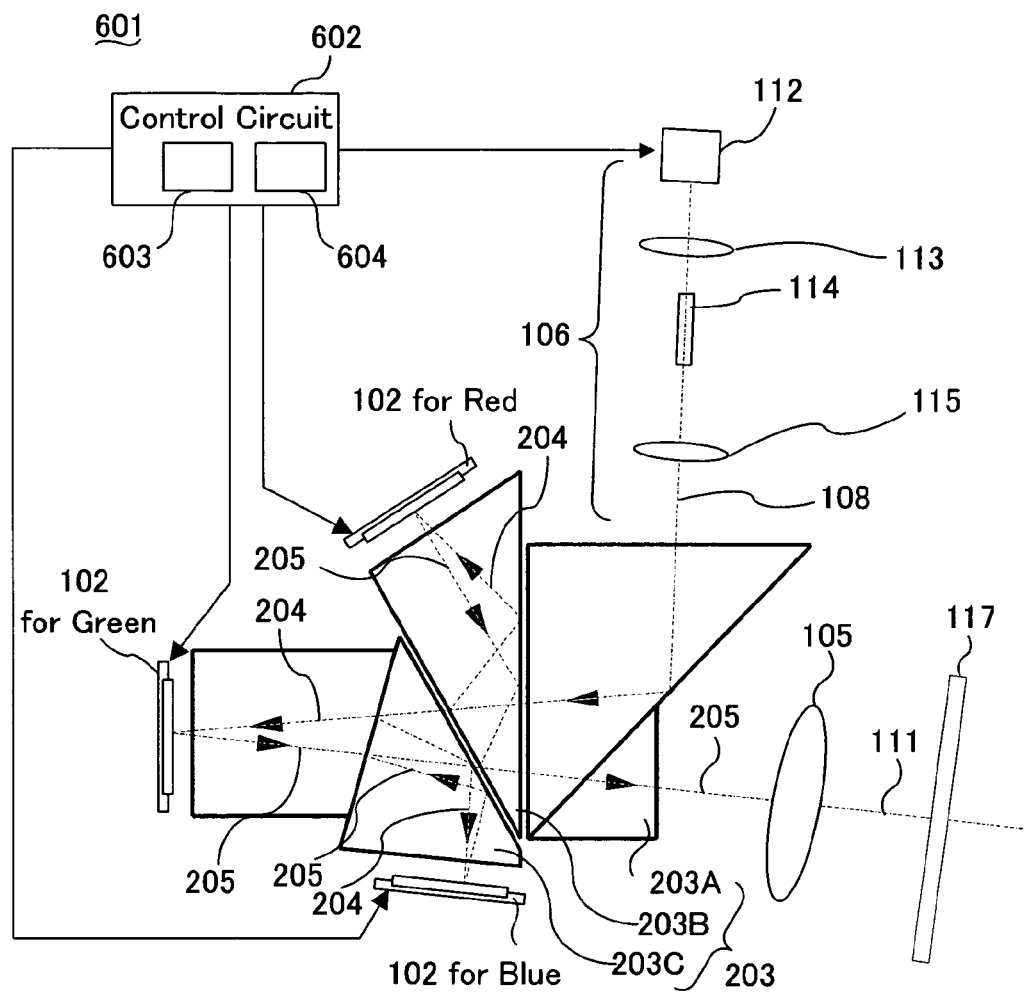
FIG. 16 is a diagram illustrating an exemplary configuration of a multi-panel projection apparatus according to a second preferred embodiment.

FIG. 16 is functional block a diagram for illustrating an exemplary configuration of a multi-panel projection apparatus according to the present embodiment.

As shown in FIG. 16, the projection apparatus 601 includes three-panel projection apparatus comprising three SLMs 102 and is different from the above described projection apparatus 501. Furthermore, the projection apparatus 601 comprises a control circuit 602 instead of the control circuit 502.

The control circuit 602 includes an image process unit 603 and a pseudo pixel conversion function ON/OFF unit 604.

The image process unit 603 is implemented with three SLMs 102 and performs the process for analyzing the signal transmitted through an externally input image (i.e. an input image) for projecting the image. This process includes the above described pseudo pixel conversion process.

The pseudo pixel conversion function ON/OFF control unit 604 controls the changeover for turning ON and OFF the image process unit 603 to carry out a pseudo pixel conversion process on the basis of the projection image data that is a signal related to the input image.

The control circuit 602 controls three SLMs 102 and a laser light source 112. When the pseudo pixel conversion function ON/OFF control unit 604 turns ON the image process unit 603 to carry out a pseudo pixel conversion process, the control circuit 602 applies the data processed by the pseudo pixel conversion process to control the three SLMs 102 and laser light source 112. More specifically, the control circuit 602 applies a pulse-width-modulation (PWM) process to control the individual pixel elements of three SLMs 102. The control circuit 602 further controls the image process unit 603, three SLMs 102 and laser light source 112 to operate in a coordinated and synchronous manner.

The light source optical system 106, light separation/synthesis optical system 203 and projection optical system 105 are similarly configured as above-described FIG. 10 and therefore the description is not repeated here.

The pseudo pixel conversion function ON/OFF control unit 604 of projection apparatus 601 may also controls the image process unit 603 to perform a pseudo pixel conversion process, in the same manner as the operation of the pseudo pixel conversion function ON/OFF unit 504 shown in FIG. 14. The pseudo pixel conversion function ON/OFF control unit 604 can further control the individual SLMs 102 to carry out operation of FIG. 15 on the basis of the projection image data related to an input image. The processes can temporally change the interference states of the laser light reflecting diffusely on the screen 117 and therefore reduce the occurrence of the speckle effect.

The projection apparatus according to the present embodiment may be modified as follows in addition to the control processes and configurations described above.

For example, a projection apparatus according to the present embodiment may be configured as a multi-panel projection apparatus as the projection apparatus 601. At least one SLM may be implemented with the image process unit to perform the operation as shown in FIG. 15.

Furthermore, the image process unit of the projection apparatus according to the present embodiment may also apply a pseudo pixel conversion process to a part of an image. In this case, the image process unit detects an image region with a very little change of images in consecutive frames to apply a pseudo pixel conversion process to the aforementioned detected image region.

Furthermore, the load of image process may be reduced because it is not required to continuously carry out a pseudo pixel conversion process by turning ON/OFF the pseudo pixel conversion process on the basis of the input image data.

Furthermore, the projection apparatus according to the present embodiment may be implemented with an actuator unit for driving the screen 117 as a projection surface for displaying an image by using a pseudo pixel conversion process performed by the image process unit. In this case, it is different from the conventional configuration attempting to reduce the occurrence of the speckle effect only by driving a screen. Therefore the amplitude of driving the screen 117 can be smaller than the above-described apparatuses, thus enabling a reduction in the size of the apparatus.

Furthermore, the projection apparatus according to the present embodiment may combine with the configuration of the projection apparatus according to the above-described first embodiment or the third embodiment as described below.

As described above, the projection apparatus according to the present embodiment can reduce the occurrence of the speckle effect with a simple and compact package for integrating in a projection apparatus comprising a laser light source.

Third Embodiment

A projection apparatus according to a third preferred embodiment of the present invention includes at a least laser light source for emitting an illumination light to transmit through an illumination optical system for projecting to a spatial light modulator (SLM) for modulating the illumination light and generating a modulated light for transmitting through a projection optical system for projecting to a projection surface to display an image thereon. The image projection apparatus further includes an image process unit for analyzing an input image to carry out a conversion process to covert a signal representing an input image to reproduce the gradation of one pixel on the basis of a time period when the modulation light from the corresponding one pixel element (which corresponds to the aforementioned one pixel) included in the SLM is projected on a projection surface, The control patterns may be different for each of the plurality of pixel elements when the gradations of a plurality of pixels in the same levels are reproduced by the plurality of pixel elements corresponding to each mirror element in the SLM.

Figure 17:
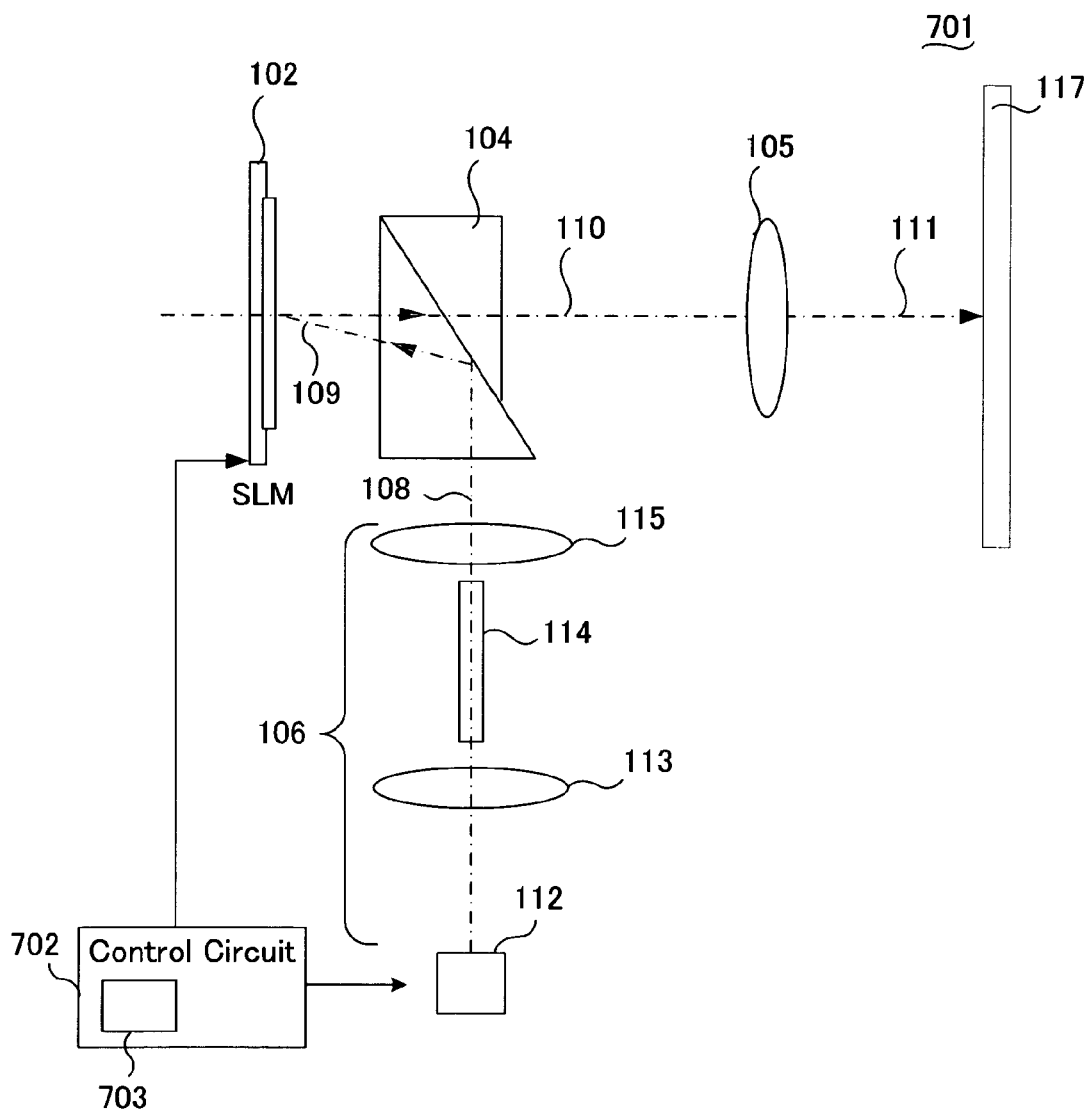
FIG. 17 is a diagram illustrating an exemplary configuration of a single-panel projection apparatus according to a third preferred embodiment.

FIG. 17 is a functional block diagram for illustrating an exemplary configuration of a single-panel projection apparatus according to the present embodiment.

As shown in FIG. 17, the projection apparatus 701 is different from the projection apparatus 501 shown in FIG. 14. The projection apparatus 501 comprises a control circuit 702 in place of the control circuit 502 shown in FIG. 14. The configuration of FIG. 17 is the same as the configuration shown in FIG. 14 and therefore the description is not repeated here.

The control circuit 702 includes an image process unit 703.

The image process unit 703 further analyzes the signal related to an externally input image (i.e., an input image) that constitutes a projection image.

This process includes a process for converting the signal related to an input image for displaying one pixel of image with a gray scale gradation in a time period when the modulation light from the corresponding one pixel element of the SLM 102 is projected onto the screen 117. The control patterns of each of the plurality of pixel elements as part of the SLM 102 are not completely identical when the same level of gray scale gradations of a plurality of pixels are displayed with light modulated by a plurality of pixel elements as part of the SLM 102.

Specifically, the control pattern of each of the plural pixel elements can be configured to control each pixel element to operate in an ON state in one period or plural periods within one frame period. Furthermore, the control pattern of the plural pixel elements can use a common control pattern for every one or multiple pixel elements as part of a plurality of pixel elements. Furthermore, the same or different control patterns for each of the plurality of pixel elements may be configured in each one frame period. Different control pattern can be applied for every frame period or for a plurality of frame periods.

The control circuit 702 applies the data processed by the image process unit 703 with a conversion process to control the SLM 102 and laser light source 112. Note that the control circuit 702 controls each pixel element of the SLM 102 by applying a pulse width modulation (PWM) process. Furthermore, the control circuit 702 also controls the image process unit 703, SLM 102 and laser light source 112 to operate synchronously.

Figure 18:
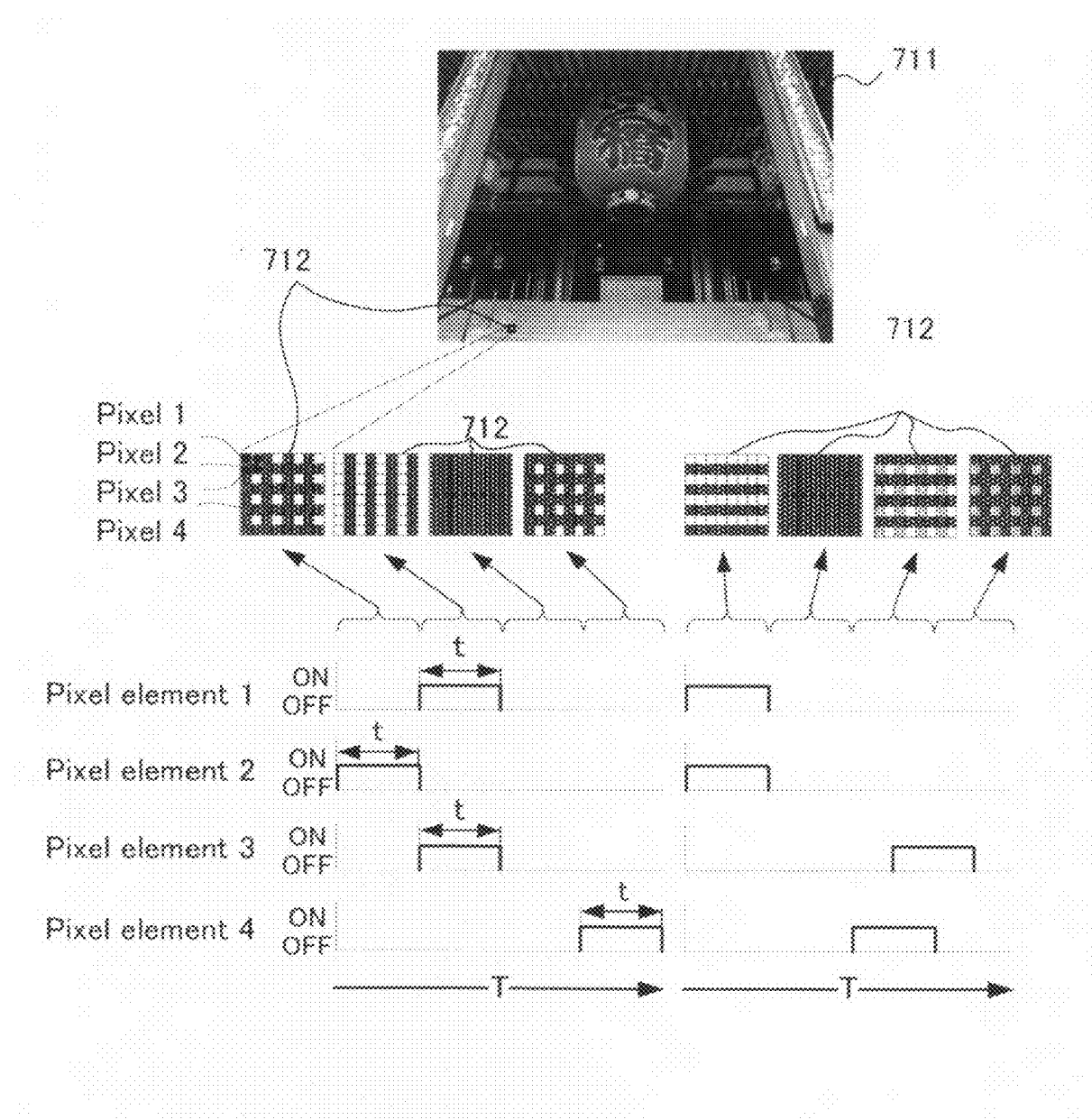
FIG. 18 is a diagram describing an exemplary control of an SLM when an image is displayed on the basis of data after an image process unit applying a conversion process.

FIG. 18 shows timing diagrams and a picture with different level of darkness for describing an exemplary control process of the SLM 102. The control process display an image by applying the image data processed and converted by the image process unit 703 with a conversion process. Note that the exemplary control process shows the gradations are in the same levels for displaying a plurality of pixels as part of the partial image within an image for display.

FIG. 18 shows an exemplary control process for two frame periods of the four pixel elements 1, 2, 3 and 4 corresponding to four adjacent pixels 1, 2, 3. These four pixels represent a plurality of pixels as part of the partial image 712 within an image 711 to be displayed. FIG. 18 includes a symbol "T" to represent one frame period. Furthermore, the gradation of each pixel included in the partial image 712 is indicated by different levels of darkness in the drawing. Although not shown in the drawing, similar control process to control four pixel elements corresponding to all other four adjacent pixels as part of the partial image 712 is carried out. The four pixel elements corresponding to two adjacent pixels on the right of the pixel 2 and two the adjacent pixels on the right of the pixel 4 represent same control processes applied to four adjacent pixels.

Figure 1C:
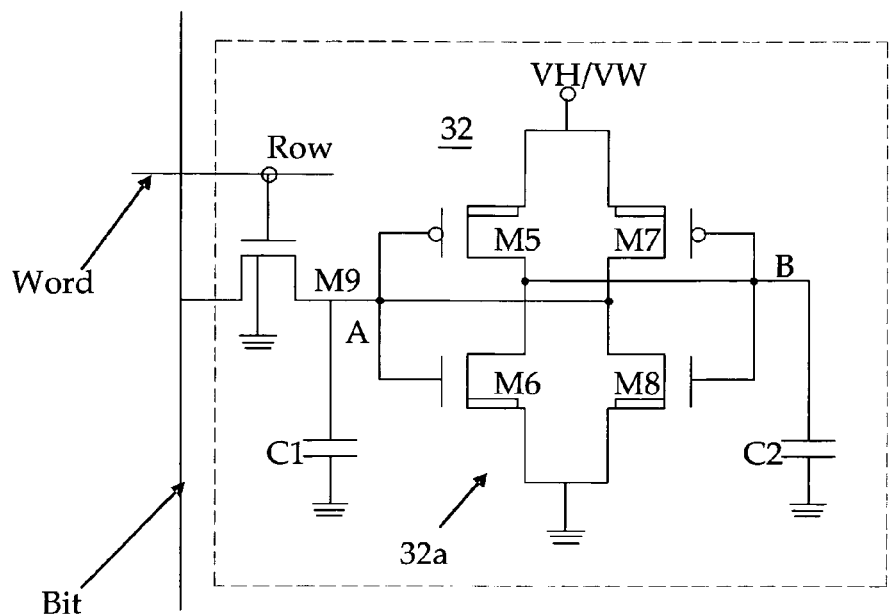
FIG. 1C is a circuit diagram for showing a related art circuit for controlling a micromirror to position at an ON and/or OFF states of a spatial light modulator.
Figure 1D:
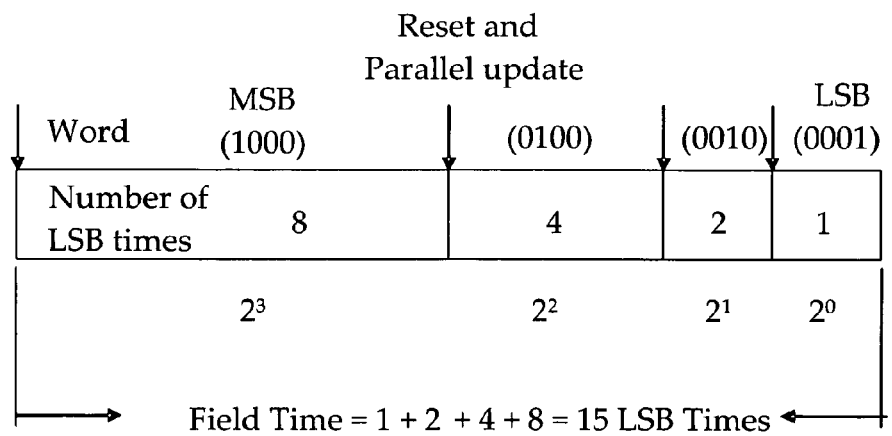
FIG. 1D is diagram for showing the binary time intervals for a four-bit gray scale.
Figure 2:
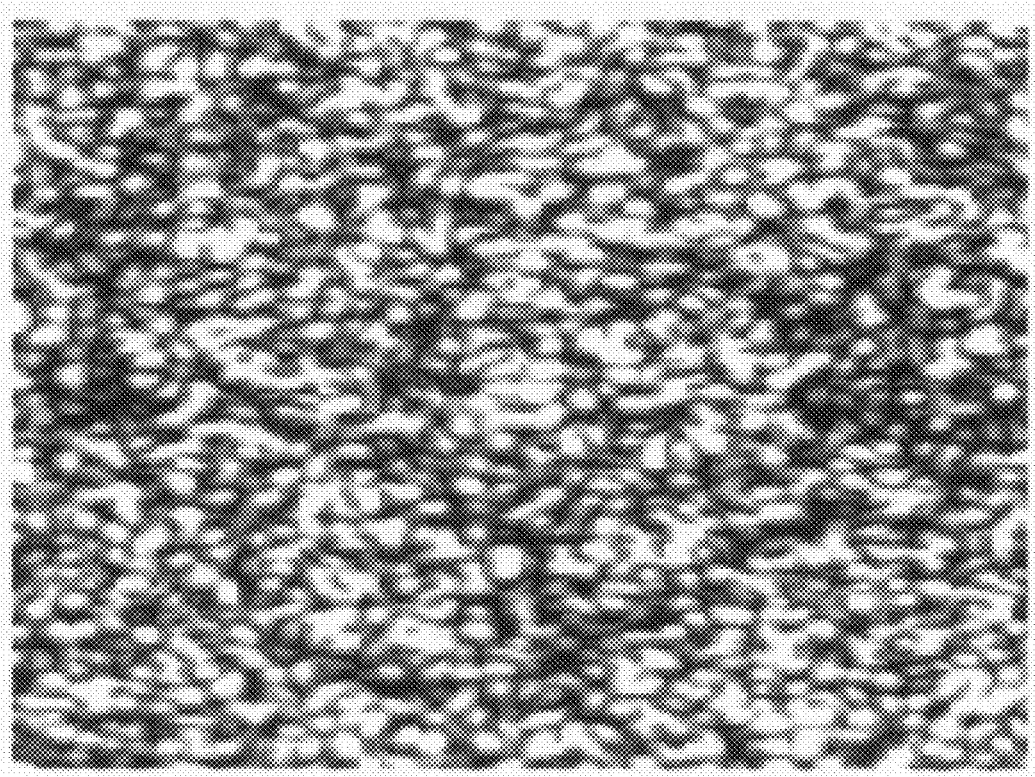
FIG. 2 is a diagram illustrating an example of projection image in a viewer's viewpoint when a speckle effect occurs.
Figure 3A:
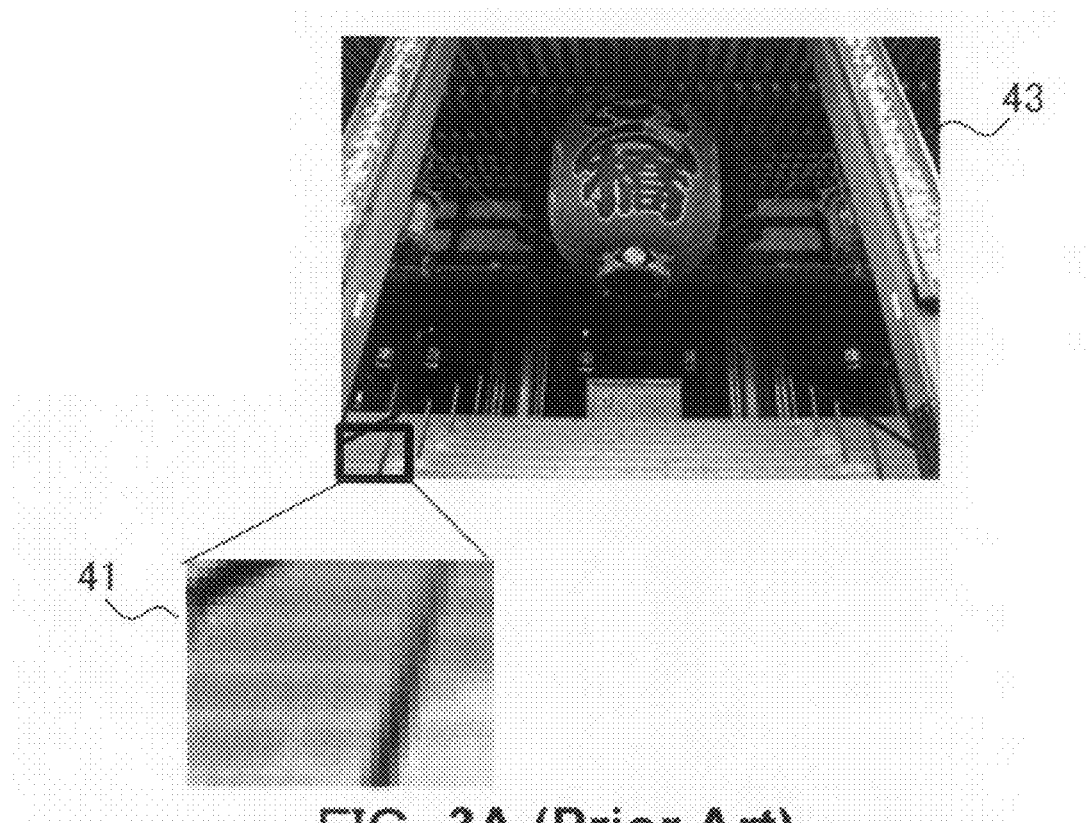
FIG. 3A is a diagram exemplifying an image when it is displayed without applying a dither process.
Figure 3B:
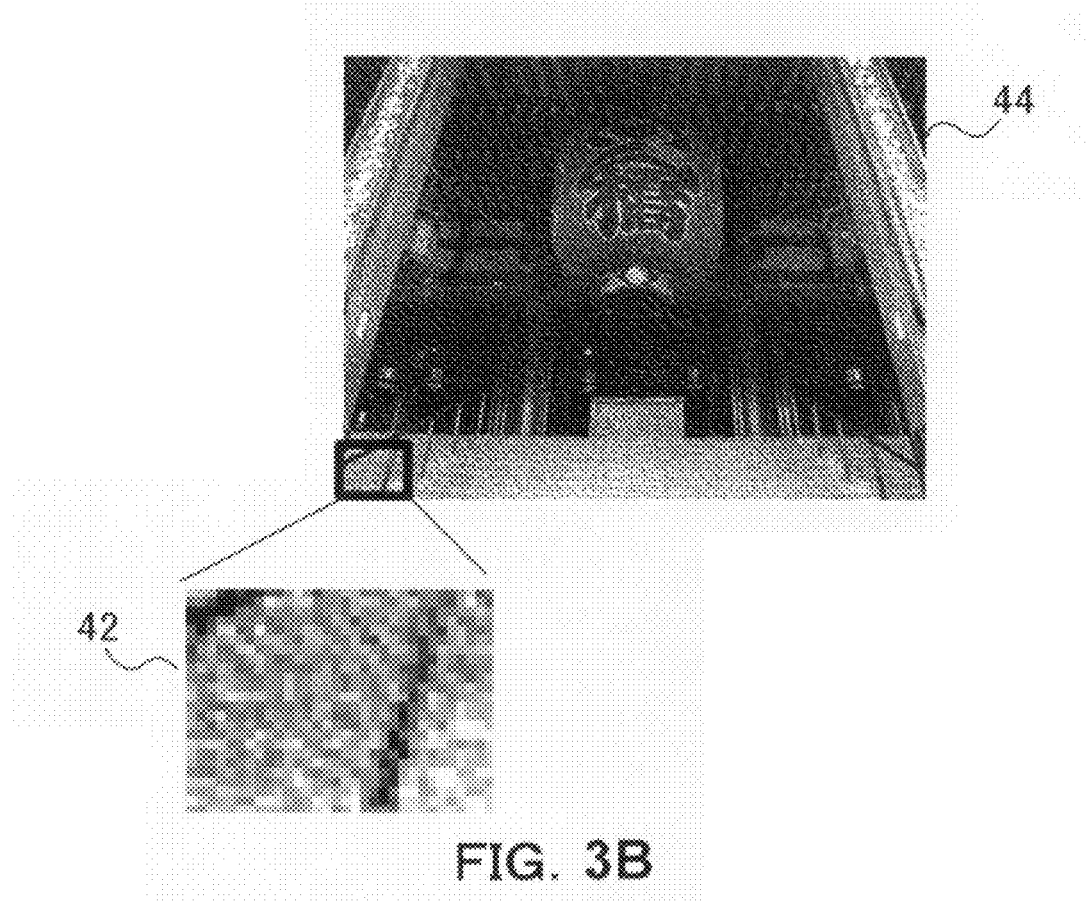
FIG. 3B is a diagram exemplifying an image when it is displayed by applying a dither process.
Figure 4:
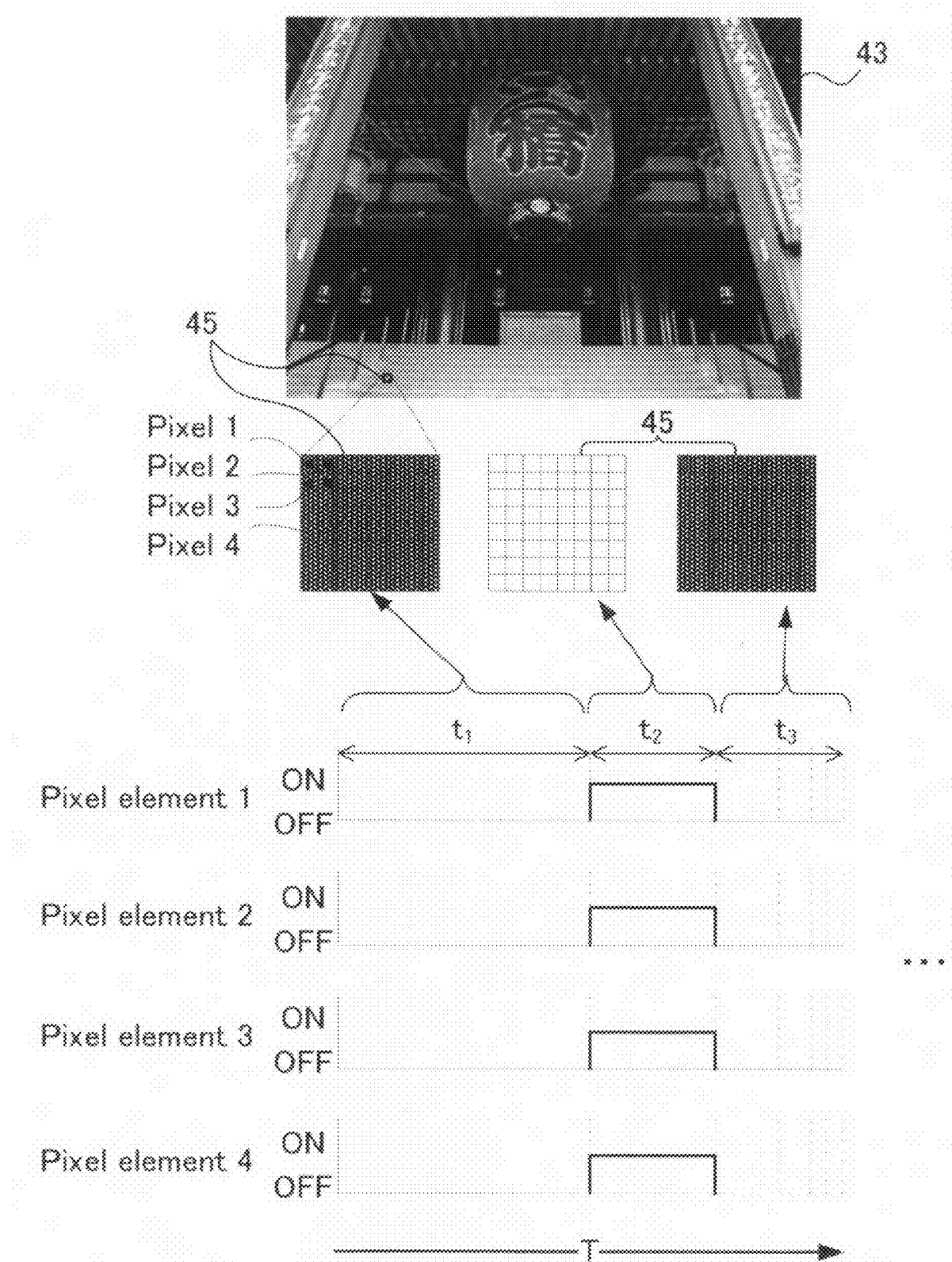
FIG. 4 is a diagram describing an example of controlling a spatial light modulator (SLM) comprised by a projection apparatus when the image shown in FIG. 3A is displayed.

According to conventional control processes, the control pattern is the same for each of the plurality of pixel elements corresponding to a plurality of pixels uniformly reproduced gradations of scale during one frame period. The control pattern is the same for every one frame period, as shown in the control pattern of the pixel elements 1, 2, 3 and 4 as further shown in FIG. 4.

In contrast, FIG. 18 shows an exemplary control process with different control patterns for the pixel elements 1, 2, 3 and 4.

Specifically, FIG. 18 shows the start timing of a period (t) for turning on each pixel element of the pixel elements 1, 2, 3 and 4 within one frame period is different between two or more pixel elements. For example, within the first frame period as shown in FIG. 18:

at the first period t: the pixel element 2 is turned ON, and the pixel elements 1, 3 and 4 are turned OFF;

at the next period t: the pixel elements 1 and 3 are turned ON, and the pixel elements 2 and 4 are turned OFF;

at the next period t: the pixel elements 1, 2, 3 and 4 are turned OFF;

at the last period t: the pixel elements 4 is turned ON, and the pixel elements 1, 2 and 3 are turned OFF, while the start timings of periods in which the individual pixel element are turned ON are different among the pixel elements 2, 1 (or 3) and 4.

However, the period for operating each pixel element of the pixel elements 1, 2, 3 and 4 in an ON state is the same during one frame period since the gray scale gradations of the pixels 1, 2, 3 and 4 are reproduced in the same levels.

In the meantime, FIG. 18 shows an exemplary control process implemented with different control patterns between each of the pixel elements of the pixel elements 1, 2, 3 and 4 during one frame period. Examining the operation of the pixel element 1 of FIG. 18, the period when a pixel element is turned ON is naturally the same between the first frame period and the second frame period. In contrast, the start timings of a period when a pixel element is turned ON during one frame period are different between the two frame periods.

Accordingly, FIG. 18 shows the exemplary control process differentiates the start timings of a period for controlling a pixel element under the ON state within one frame period between two or more pixel elements with the same gradations of gray scales. The differences of the starting times between the pixels temporally change the interference states of the laser lights reflecting diffusely on the screen 117 thus reducing the occurrence of the speckle effect.

Figure 19:
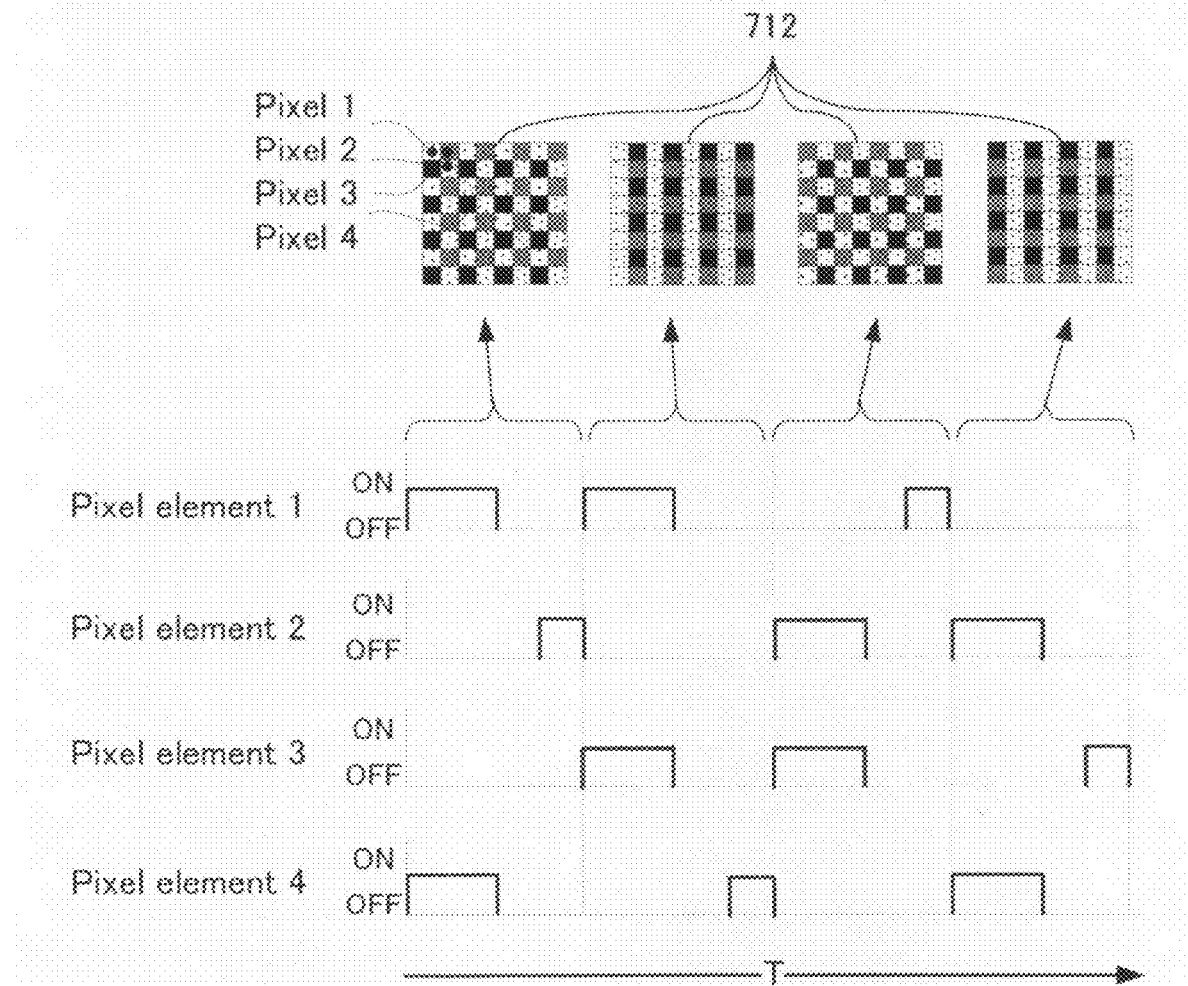
FIG. 19 is a diagram describing another exemplary control of an SLM when an image is displayed on the basis of data after an image process unit applying a conversion process.

FIG. 19 is a timing diagram for describing another exemplary control process for applying the image data processed by the image process unit 703 with a conversion process for operating the SLM 102 to display an image. Note that the exemplary control process generates the same gray scale levels for the gradations of a plurality of pixels as part of a partial image of an image display.

FIG. 19 shows an exemplary control process for one frame period of the four pixel elements 1, 2, 3 and 4 corresponding to four adjacent pixels 1, 2, 3 and 4. These four pixels represent a plurality of pixels included in the partial image 712 for displaying the image 711. FIG. 19 shows one frame period by "T". Furthermore, the gray scale gradations of individual pixels included in the partial image 712 are indicated by the darkness. Although not shown in the drawing, the control process applied to these four pixel elements represent the control process applied to any four adjacent pixels as part of the partial image 712. The control processes are carried out similarly (e.g., four pixel elements corresponding to the adjacent two pixels on the right of the pixel 2 and to the adjacent two pixels on the right of the pixel 4).

According to the exemplary control process shown in FIG. 19, different control patterns are applied in one frame period, for several pixel elements corresponding to pixels with the same gray scale gradations. Furthermore, control patterns for a plurality of periods within one frame period for a plurality of pixel elements are provided. The position change unit for the pixel element is turned ON, as indicated by the control patterns for the pixel elements 1, 2, 3 and 4.

Specifically, FIG. 19 shows the control pattern for three periods within one frame period for each of the pixel elements 1, 2, 3 and 4. In these periods the start timings of the three periods for turning on the pixel element is different for the respective control patterns. Note that the total length of the three periods for the respective control patterns are the same since the images for displaying the pixels 1, 2, 3 and 4 are based on the same gray scale gradations. Furthermore, in the exemplary control process, the control pattern within one frame period shown in FIG. 19 may be repeated in the succeeding frame period(s) or alternately, different control patterns may be used therein under the above-described condition.

According to the above-described operations, the exemplary control process shown in FIG. 19 can temporally change the interference states of the laser light reflecting diffusely on the screen 117 during one frame period to reduce the occurrence of the speckle effect.

Figure 20:
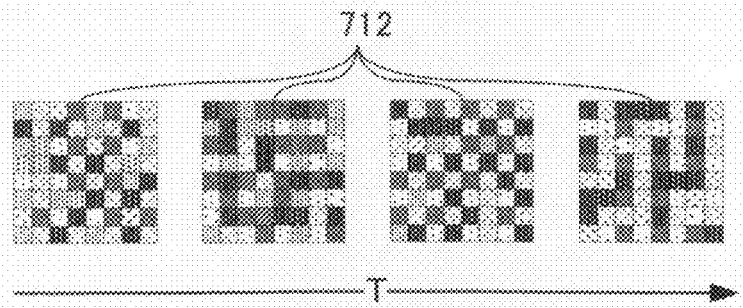
FIG. 20 is a diagram describing another exemplary control of an SLM when an image is displayed on the basis of data after an image process unit applying a conversion process.

Note that, according to each of the above described exemplary control processes shown in FIGS. 18 and 19, the control process is carried out by using four common control patterns for every four pixel elements when controlling a plurality of pixel elements corresponding to the plurality of pixels included in the partial image 712 corresponding to four adjacent pixels included in the partial image 712. The combination of pixel elements using common control patterns, however may include other combination as shown in FIG. 20. Note that FIG. 20 shows four partial images 712 displayed in each of four periods generated by dividing one frame period (T) into 4 equal parts, with the gray scale gradations of the individual pixels defined according to the image data in each partial image 712.

Furthermore, an alternative configuration may operate with control patterns for a plurality of pixel elements corresponding to the plurality of pixels included in the partial image 712 with each pixel element operated differently under the above-described condition.

Incidentally, the projection apparatus according to the exemplary configuration shown in FIG. 17 is configured as a single-panel projection apparatus, it is, however, possible to configure as multi-panel projection apparatus comprising more than one SLM 102.

Figure 21:
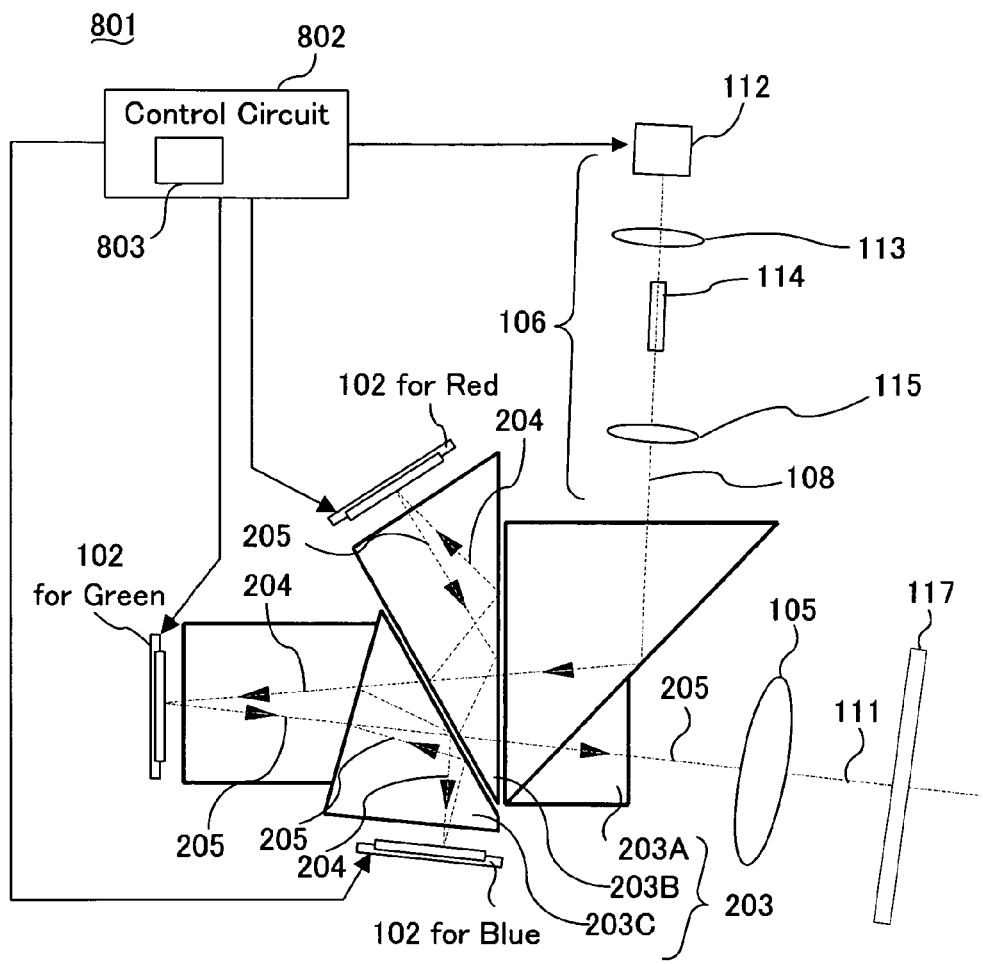
FIG. 21 is a diagram illustrating an exemplary configuration of a multi-panel projection apparatus according to a third preferred embodiment.

FIG. 21 is a diagram illustrating an exemplary configuration of a multi-panel projection apparatus according to the present embodiment.

As shown in FIG. 21, the projection apparatus 801 is different from the above-described projection apparatus 701. The projection apparatus 701 is a three-panel projection apparatus implemented with three SLMs 102. The projection apparatus 801 further comprises a control circuit 802 instead of the control circuit 702.

The control circuit 802 includes an image process unit 803.

The image process unit 803 carries out the operation similar to that of the above-described image process unit 703 for each of the three SLMs 102.

The control circuit 802 controls the three SLMs 102 and laser light source 112 by applying the data after the image process unit 803 completes a conversion process. Note that the control circuit 802 controls each pixel element of three SLMs 102 by applying a pulse-width modulation PWM control process. The control circuit 802 also controls the image process unit 803, three SLMs 102 and laser light source 112 to operate synchronously.

The light source optical system 106, light separation/synthesis optical system 203 and projection optical system 105 are arranged according to a same configuration as described with reference to the above-described FIG. 10 and therefore the description is not repeated here.

Also in the case of the projection apparatus 801, when the gray scale gradations of a plurality of pixels of a partial image within an image for display are reproduced with the same gradations, the control patterns during one frame period for the respective pixel elements of each SLM 102 corresponding to the plural pixels are controlled to operate differently from one another. The process temporally changes the interference states of the laser light reflecting diffusely on the screen 117 thus reducing occurrence of the speckle effect.

In addition to the above-described configuration, the projection apparatus according to the present embodiment may be modified as follows.

For example, the projection apparatus according to the present embodiment may also be implemented with an actuator unit for driving the screen 117 as a projection surface. The operation may be carried out when an image is displayed according to the image data after the image process unit applies a conversion process. This configuration is different from the above-described configuration that reduces the occurrence of the speckle effect only by driving a screen. The amplitude of driving the screen 117 can be set smaller than the above-described configuration, enabling a reduction in the apparatus size.

Furthermore, the projection apparatus according to the present embodiment may also be combined with the configuration and operational processes of the projection apparatus according to the above described first or second embodiment.

Further, an image processing load can be reduced in comparison with an apparatus that requires continuous operation of the process of switching on/off the above-described process based on the input image data.

As described above, the projection apparatus according to the present embodiment can reduce the obviousness of the speckle effect with a simple and compact controller in a projection apparatus implemented with a laser light source. Note that the projection apparatus according to the second embodiment is configured to temporally change the dither process algorithm only when the gradation inherently reproduced by an SLM does not satisfy the requirement. Therefore, the speckle shown on an image is reduced; whereas the projection apparatus according to the present embodiment can further temporally change, for example the interference state of the laser light reflecting diffusely on the screen 117 in each one frame period. Thus the apparatus can apply the image data to precisely reproduce the original gradation of each pixel. Thus, the speckle shown on an image is reduced.

In the meantime, it is well known that the human has a higher sensitivity for viewing the color green. Considering this, the above-described speckle reduction process may be carried out for the display for the green color while a regular display process is performed for other colors, the load of image processes may be reduced with reduced power consumption while the quality of image display can still be significantly improved.

Accordingly, while the detail descriptions of the present invention has been provided, it shall be clear, however, that the present invention may be improved or modified in various manners and would still be within the scope and spirit of the present invention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

The invention claimed is:

1. A projection apparatus comprising a light source for projecting an illumination light through an illumination optical system to a spatial light modulator (SLM) for modulating the illumination light for generating and transmitting an image projection light to an image projection surface through a projection optical system to display an image, the projection apparatus further comprising:
   an image process unit for receiving and analyzing an input image data; and
   the image process unit applies a conversion process to a signal related to the input image data to generate different control patterns for a plurality of adjacent pixel elements included in the SLM for a predetermined period during at least one frame period to reproduce a gradation of the pixel whereby each of the plurality of adjacent pixel elements has a gradation of approximately a same level.

2. The projection apparatus according to claim 1, wherein: the image process units applies the conversion process to generate the control patterns for the plurality of pixel elements by applying a common control pattern for every one or more pixels elements included in the plural pixel elements.

3. The projection apparatus according to claim 1, wherein: the image process units applies the conversion process to generate a different control pattern for each of the plural pixel elements for every one frame period or every plural frame periods.

4. The projection apparatus according to claim 1, further comprising:
   an actuator unit for driving a screen constituting a projection surface for projecting an image thereto for displaying the image thereon.

5. The projection apparatus according to claim 1, further comprising:
   an imaging position change unit for changing an image position projected by a modulation light from the SLM on a projection surface.

6. The projection apparatus according to claim 1, further comprising:
   a control unit to control the SLM to project the modulation light on a projection surface in selected subframe periods within a frame selected on the basis of analysis results of an input signal including a geometric progression and accumulated progression in the selected periods.

7. The projection apparatus according to claim 1, further comprising:
   a control unit to control the SLM to project the modulation light on a projection surface in selected subframe periods within a frame selected on the basis of an input signal in the selected subframes and an accumulation of the input signal in the selected subframe periods.

8. The projection apparatus according to claim 1, wherein: The image process units applies the conversion process to generate an adjustable control pattern adjustable according to a difference of starting time of modulating a pixel element within one frame.

9. The projection apparatus according to claim 1, wherein: the image process unit further performs a pseudo pixel conversion process for applying a conversion process to a signal related to the input image by temporally differentiating an algorithm of the conversion process for generating and displaying a gradation of a one pixel equivalent to the input image of a plurality of pixel elements included as part of the SLM.

10. A projection apparatus comprises a laser light source for emitting an illumination light through an illumination optical system for projecting to a spatial light modulation (SLM) for generating and transmitting a modulated light through a projection optical system to project the modulated light from the SLM onto a projection surface, the projection apparatus further comprising:
    an image process unit for analyzing an input image; and
    the image process unit further performs a pseudo pixel conversion process for applying a conversion process to a signal related to the input image by temporally differentiating an algorithm of the conversion process for generating and displaying a gradation of a one pixel equivalent to the input image of a plurality of pixel elements included as part of the SLM.

11. The projection apparatus according to claim 10, wherein:
    the image process unit detects an image region with a small change of images in a plurality of consecutive frames for applying the pseudo pixel conversion process to the image data of the image region detected with the small change of images.

12. The projection apparatus according to claim 10, further comprising:
    an actuator unit for driving a screen constituting a projection surface for projecting an image thereto for displaying the image thereon.

13. The projection apparatus according to claim 10, further comprising:
    an imaging position change unit for changing an image position projected by a modulation light from the SLM on a projection surface, and
    a control unit for controlling the SLM and the image position change unit.

14. The projection apparatus according to claim 13, wherein:
    the image process unit applies a conversion process to a signal related to the input image data to generate different control patterns for a plurality of adjacent pixel elements included in the SLM for a predetermined period during at least one frame period to reproduce a gradation of the pixel whereby each of the plurality of adjacent pixel elements has a gradation of approximately a same level.

* * * * *